(12) United States Patent
Yano

(10) Patent No.: US 7,729,549 B2
(45) Date of Patent: Jun. 1, 2010

(54) IMAGE PROCESSING APPARATUS AND IMAGE PROCESSING METHOD

(75) Inventor: Takanori Yano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 943 days.

(21) Appl. No.: 11/515,163

(22) Filed: Sep. 1, 2006

(65) Prior Publication Data

US 2007/0051817 A1 Mar. 8, 2007

(30) Foreign Application Priority Data

Sep. 2, 2005 (JP) .............................. 2005-255759
Aug. 9, 2006 (JP) .............................. 2006-217563

(51) Int. Cl.
*G06K 9/36* (2006.01)

(52) U.S. Cl. ...................................... 382/234

(58) Field of Classification Search ......... 382/232–234, 382/238–248; 348/394.1–395.1, 403.1–404.1, 348/424.2; 375/240.02, 240.12, 240.18–240.19, 375/240.23

See application file for complete search history.

(56) References Cited

U.S. PATENT DOCUMENTS

| | | | | |
|---|---|---|---|---|
| 7,298,909 B2 * | 11/2007 | Ishikawa | ..................... | 382/232 |
| 7,324,695 B2 * | 1/2008 | Krishnan et al. | ............. | 382/232 |
| 7,382,926 B2 * | 6/2008 | Joshi et al. | ................... | 382/240 |
| 7,447,369 B2 * | 11/2008 | Gormish et al. | ............. | 382/235 |
| 7,558,430 B2 * | 7/2009 | Enokida | ..................... | 382/240 |

FOREIGN PATENT DOCUMENTS

| | | |
|---|---|---|
| JP | 2003-169216 | 6/2003 |
| JP | 2003-179760 | 6/2003 |
| JP | 2004-242273 | 8/2004 |
| JP | 2004-274758 | 9/2004 |
| JP | 2005-012686 | 1/2005 |

* cited by examiner

*Primary Examiner*—Jose L Couso
(74) *Attorney, Agent, or Firm*—Blakely, Sokoloff, Taylor & Zafman LLP

(57) ABSTRACT

An image processing apparatus is disclosed. The image processing apparatus includes an extraction unit to extract layer levels of each packet included in partial encoded data, an estimation unit to calculate the number of layer levels of each packet based on the extracted layer levels of each packet and estimates a greatest layer level of each packet, a writing unit to write the greatest layer level of each packet in a management table, and a formation unit to form a layer data table in which each layer has the greatest layer level. The writing unit changes the layer levels of each layer written in the management table to the layer levels of each layer included in newly received partial encoded data when the layer levels included in the newly received partial encoded data are larger than the layer levels written in the management table.

6 Claims, 28 Drawing Sheets

FIG.5
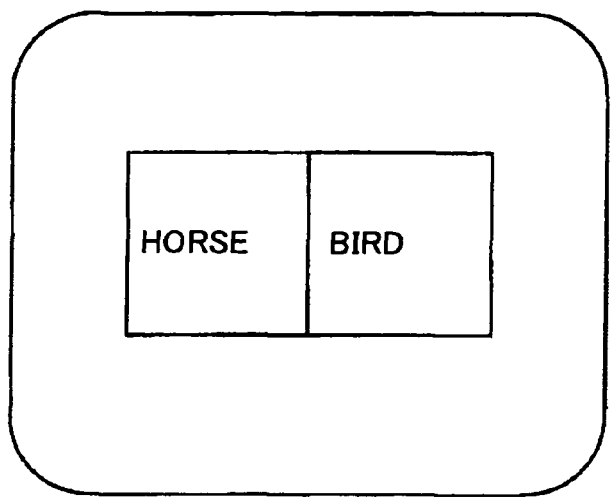
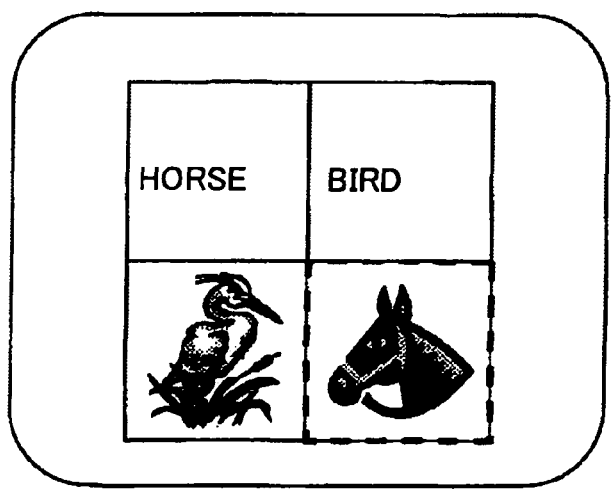
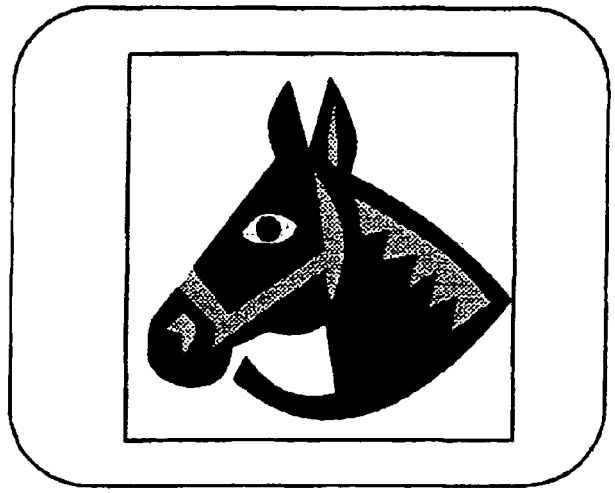

<STRUCTURE TABLE 2>

| LEVEL OF EACH LAYER | | | POINTER TO ENCODED DATA |
|---|---|---|---|
| 1 | 1 | 1 | |
| 1 | 1 | 2 | |
| 2 | 1 | 1 | |
| 2 | 1 | 2 | |
| 1 | 2 | 1 | |
| 1 | 2 | 2 | |
| 2 | 2 | 1 | |
| 2 | 2 | 2 | |
| 1 | 3 | 1 | NULL |
| 1 | 3 | 2 | NULL |
| 2 | 3 | 1 | |
| 2 | 3 | 2 | |

<STRUCTURE TABLE BEFORE CHANGED>

| LEVEL OF EACH LAYER | | | POINTER TO ENCODED DATA |
|---|---|---|---|
| 1 | 1 | 1 | |
| 1 | 1 | 2 | |
| 1 | 2 | 1 | |
| 1 | 2 | 2 | |
| 1 | 3 | 1 | NULL |
| 1 | 3 | 2 | NULL |
| 2 | 1 | 1 | |
| 2 | 1 | 2 | |
| 2 | 2 | 1 | |
| 2 | 2 | 2 | |
| 2 | 3 | 1 | |
| 2 | 3 | 2 | |

<STRUCTURE TABLE AFTER CHANGED>

FIG.26
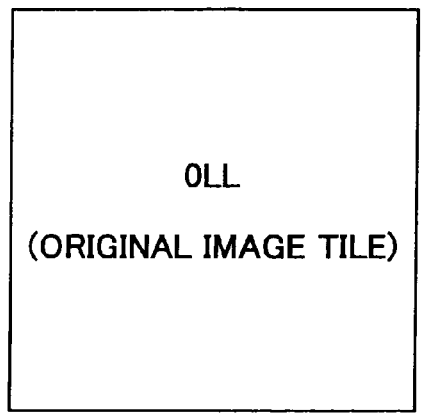
DECOMPOSITION_LEVEL_0
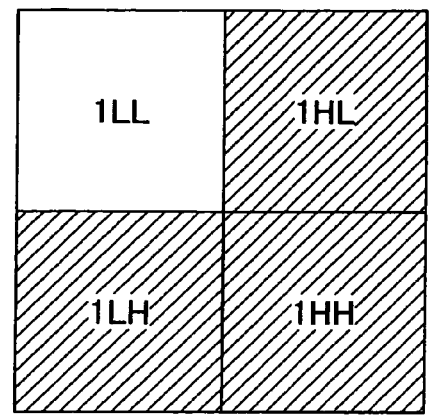
DECOMPOSITION_LEVEL_1
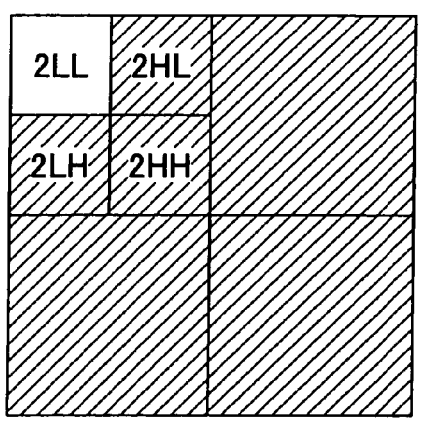
DECOMPOSITION_LEVEL_2
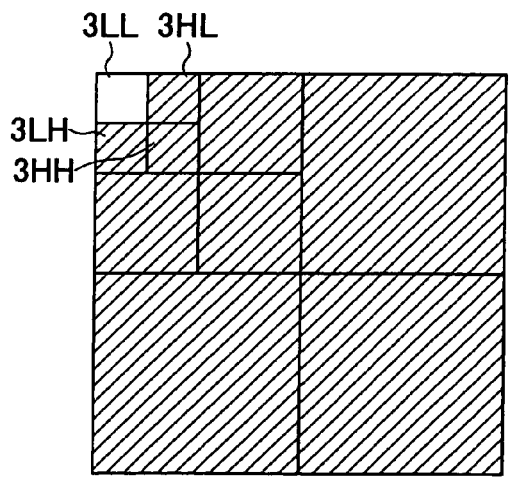
DECOMPOSITION_LEVEL_3

IMAGE PROCESSING APPARATUS AND IMAGE PROCESSING METHOD

PRIORITY

The present application claims priority to and incorporates by reference the entire contents of Japanese Priority Patent Application No. 2005-255759, filed on Sep. 2, 2005, and Japanese Priority Patent Application No. 2006-217563, filed on Aug. 9, 2006.

BACKGROUND OF THE INVENTION

1. Field of the Invention

The present invention generally relates to an image processing apparatus and an image processing method, which access encoded data of a partial image by using a cache model; and in particular, in which a layer structure showing a relationship between packets of encoded data stored in a memory such as a cache is estimated and the packets of the encoded data stored based on the layer structure are referred to and a reference structure of the encoded data on the memory such as the cache is formed.

2. Description of the Related Art

Generally, an image processing apparatus has been known that accesses encoded data of a partial image stored based on a layer structure by using a cache model. In addition, an image processing apparatus has been proposed which realizes all of the encoding processes stipulated in JPEG 2000 (Joint Photographic Experts Group 2000), which is a next-generation image encoding system.

Encoded data are generally stored in a cache by packets comprising encoded data. When encoded data in the cache are used, the encoded data are referred to by collecting necessary packets.

Next, a layer encoding algorithm that is the basis of JPEG 2000 is described.

FIG. 25 is a block diagram for forming the layer encoding algorithm which is the basis of JPEG 2000. The block for forming the layer encoding algorithm provides a color space converting/reverse converting portion, a two-dimensional wavelet transforming/reverse transforming portion, a quantization/reverse quantization portion, an entropy encoding/decoding portion, and a tag processing portion (packet string forming portion).

One of the biggest differences of the JPEG 2000 algorithm from the JPEG algorithm is a transforming method. In JPEG, DCT (discrete cosine transform) is used; however, in the layer encoding algorithm of JPEG 2000, DWT (discrete wavelet transform) is used. The DWT has an advantage in that good image quality can be obtained in a high compression region compared with the DCT. This is the reason that JPEG 2000, which is a successor of JPEG, has adopted the DWT. In addition, as another big difference from JPEG, in order to form codes in the final stage in JPEG 2000, a functional block called the tag processing unit is newly added. In the tag processing portion, when encoding operations are executed, encoded data are formed as a code stream, and when decoding operations are executed, a necessary code stream is interpreted. By the code stream in JPEG 2000, various advantageous functions have been able to be realized.

FIG. 26 is a diagram which explains freely stopping compression and expansion operations of a still image on an arbitrary layer (decomposition level) corresponding to an octave division on the DWT of a block base.

For example, as shown in FIG. 26, in JPEG 2000, compression and expansion operations of a still image can be stopped on an arbitrary layer (decomposition level) corresponding to an octave division on the DWT of a block base.

As an input and output section of an original image, the color space converting/reverse converting portion is used. For example, in the color space converting/reverse converting portion, conversion or reverse conversion from a RGB color system composed of components of R (red), G (green), and B (blue) of primary colors or from a YMC color system composed of components of Y (yellow), M (magenta), and C (cyan) of supplementary colors into a YUV color system or a YCbCr color system is executed.

Next, the layer encoding algorithm (JPEG 2000 algorithm) is described in detail.

FIG. 27 is a diagram in which each component of an original image is divided into plural rectangular tiles. In FIG. 27, the RGB primary color system is used, and each component of a color image is divided into plural rectangular tiles. Each tile, for example, R00, R01, . . . , R15, G00, G01, . . . , G15, or B00, B01, . . . , B15 is a basic unit when compression or expansion operations are executed. Therefore, the compression or expansion operations are independently executed in each tile of each component.

At the time of encoding, data of each tile of each component are input to the color space converting/reverse converting portion (FIG. 25), the color space conversion is applied, and two-dimensional wavelet transformation (rectification) is applied to the data of the tile where the color space conversion is applied by the two-dimensional wavelet transforming/reverse transforming portion (FIG. 25) and the data of the tile are divided into spaces of frequency bands.

In FIG. 26, sub bands in each decomposition level are shown at the time when the number of the decomposition levels is three. That is, the two-dimensional wavelet transformation is applied to an original image tile (OLL) (decomposition level is 0) obtained by tile division of an original image and the OLL is divided into sub bands (1LL, 1HL, 1LH, and 1HH) shown in the decomposition level 1. After this, the two-dimensional wavelet transformation is applied to the low frequency component 1LL (decomposition level is 1) in this layer and the 1LL is divided into sub bands (2LL, 2HL, 2LH, and 2HH) shown in the decomposition level 2. Sequentially, the two-dimensional wavelet transformation is applied to the low frequency component 2LL (decomposition level is 2) and the 2LL is divided into sub bands (3LL, 3HL, 3LH, and 3HH) shown in the decomposition level 3. In FIG. 26, the sub bands to which encoding is applied in each decomposition level is shown with oblique lines. For example, when the decomposition level is 3, the sub bands (3HL, 3LH, 3HH, 2HL, 2LH, 2HH, 1HL. 1LH, 1HH) shown with the oblique lines are sub bands to which encoding is applied and the sub band 3LL is not encoded.

Next, bits to which encoding is applied are determined by a designated encoding order and a context is formed from bits surrounding the bits to which encoding is applied by the quantization/reverse quantization section.

A wavelet coefficient to which the quantization is applied is divided into rectangles called precincts which are not overlapped in each sub band. The precincts are adopted in order to effectively use memory at the time of implementation of the JPEG 2000. FIG. 28 is a diagram showing precincts each of which is formed by three rectangular regions whose spaces are matched with each other. As shown in FIG. 28, one precinct is formed by three rectangular regions whose spaces are matched with each other. In addition, each precinct is divided into rectangular code blocks that are not overlapped. Each code block is a basic unit when the entropy encoding is applied.

The entropy encoding/decoding section (FIG. 25) encodes tiles in each component by probability estimation from a context and bits to be applied. Then, all the components of the original image are encoded in each tile.

The minimum unit of encoded data formed at the entropy encoding/decoding section is called a packet. The packets are caused to be in a sequence in a progressive order, and the sequence of the packets is shown by one of image header segments. Packets are arrayed by progressive order data, for example, a region, resolution, a layer, and a color component. That is, in JPEG 2000, the following five progressions are defined by changing the priority order of the four image elements of image quality (layer L), resolution (R), a component (C), and a precinct (P).

The five progressions are a LRCP progression, a RLCP progression, a RPCL progression, a PCRL progression, and a CPRL progression. In the LRCP progression, since the precinct, the component, the resolution level, and the layer are decoded in this order, the image quality of the entire image is improved every progress of indexes of the layer, that is, the image quality progression can be realized. The LRCP progression is also called a layer progression. In the RLCP progression, since the precinct, the component, the layer, and the resolution level are decoded in this order, the resolution progression can be realized. In the RPCL progression, since the layer, the component, the precinct, and the resolution level are decoded in this order, the resolution progression can be realized similar to the RLCP progression; however, the priority of a specific precinct can be high. In the PCRL progression, since the layer, the resolution level, the component, and the precinct are decoded in this order, priority is given to decoding a specific part, and the space precinct progression can be realized. In the CPRL progression, since the layer, the resolution level, the precinct, and the component are decoded in this order, the component progression, in which, for example, a gray image is first reproduced at the time when a color image is progressively decoded, can be realized.

As described above, in JPEG 2000, an image is divided into regions (tiles and precincts), resolution, a layer, and a color component, and divided elements are independently encoded as packets. The packets are recognized and extracted from a code stream without decoding.

The tag processing section (FIG. 25, packet string forming portion) causes all of the encoded data from the entropy encoding/decoding section to be one code stream, and adds a tag to the code stream. FIG. 29 is a diagram showing a structure of a code stream. As shown in FIG. 29, tag information called a main header is added to at the head of the code stream, tag information called a tile-part header is added to each partial tile, and encoded data (bit stream) are positioned after each tile-part header. Further, tag information called an end of code stream is added to at the end of the code stream.

On the other hand, at the time of decoding, image data are formed from a code stream of each tile of each component. Referring to FIG. 25 again, decoding operations are briefly described. The tag processing portion interprets tag information added to a code stream input from the outside, and divides the code stream into a code stream of each tile of each component. The decoding operations are applied to the code stream of each tile of each component.

The positions of bits to be decoded are determined by the order based on tag information in the code stream, and in the quantization/reverse quantization portion, a context is formed from the array of bits surrounding the bits to be decoded. The entropy encoding/decoding portion forms bits by probability estimation from the context and the code stream and writes the bits in the bit positions. Decoded data are divided into spaces in each frequency band. Therefore, each tile of each component of image data is restored by the two-dimensional wavelet transformation at the two-dimensional wavelet transforming/reverse transforming portion. The restored data are converted into original color system data by the color space converting/reverse converting portion.

As a method accessing encoded data of JPEG 2000, there is JPIP (JPEG 2000 image coding system-part 9: interactivity tools, APIs and protocols). In JPIP, the encoded data received in a client are received at high speed without newly transferring the encoded data from a server; in order to achieve the above, the client provides a cache which stores a part of the encoded data.

In Japanese Laid-Open Patent Application No. 2005-12686, an image processing apparatus and an image processing method are disclosed. In this technology, in order to obtain a desired image of each tile from an apparatus which stores encoded data of an image divided into tiles and composed of plural packets, when data of a necessary number of packets are received, management information for managing each packet to be received is formed. Received packets are sequenced corresponding to a tile number to which each packet belongs, packets belonging to the same tile are sequenced again corresponding to the order in the tiles, and data of sequenced packets are added to the management information in order. Information of data disposition of each packet, in cache data including the added packet data and the management information, is registered in the management information.

In Japanese Laid-Open Patent Application No. 2004-274758, a method and an apparatus for converting a JPP stream into a JPEG 2000 code stream are disclosed. In this technology, a main header bin is written in an output JPEG 2000 code stream together with a marker segment in which a layer progression specifies the use of the last progression order. With respect to each tile, a regular tile header is written, and with respect to each component of each tile, the position, and the resolution, the number of completely received layers is determined. Bytes of a precinct data bin corresponding to a completed layer are written in the output JPEG 2000 code stream, and an empty packet header is written into each packet of each incomplete layer. In addition, an SOT (start of tile-part) marker segment is renewed for each tile in order to adjust the length into the number of bytes of packet data. An EOC (end of code stream) marker is written in the end of the output JPEG 2000 code stream. In this, the SOT marker segment signifies the head of the tile-part and shows an index of the tile and an index of the tile-part. The EOC marker signifies the end of the encoded data.

In Japanese Laid-Open Patent Application No. 2004-242273, an encoded data forming method and an apparatus thereof are disclosed. In this technology, a client stores first encoded data in encoded data managed by a server and calculates lacking second encoded data from encoded data required for forming JPEG 2000 encoded data and the first encoded data. The second encoded data are obtained from the server, the header information is analyzed, and the encoded data are divided into plural independent encoded data parts. Further, when all the independent encoded data are not stored, dummy encoded data are stored for each divided unit, and these encoded data are defined as JPEG 2000 encoded data.

In Japanese Laid-Open Patent Application No. 2003-169216, a method and an apparatus for forming encoded data are disclosed. In this technology, the method includes the steps of receiving fragmented encoded data to store in a memory, determining a progression order based on a displaying requirement of a user, revising header information based on the determination, determining whether the memory stores the corresponding encoded data based on the revised header information, reading the fragmented encoded data determined and stored in the memory, converting the read data into the progression order suitable to the displaying requirement, applying a ZLP (zero length packet) process to encoded data not stored in the memory, and forming encoded data in compliance with JPEG 2000.

However, in an image forming apparatus that performs encoding operations in compliance with JPEG 2000 using hardware circuits, the following problems occur.

That is, when encoded data of a partial image are downloaded and decoded by using JPIP, since the encoded data are fragmented partial data, the cases are few in which the downloaded encoded data (or, encoded data loaded and stored in a memory such as a cache) include all packets that comprise the encoded data, this is because the encoded data of the partial image include only a part of the packets of which the encoded data are composed.

In JPIP, there is a function in which packets of encoded data of a partial image transferred from a server to a client are stored in a cache (memory) and are reused in the client. That is, the client can efficiently reproduce the encoded data. New packets of encoded data of a partial image transferred from a server to a client are sequentially stored in a cache of the client. However, generally, the encoded data that are stored in the cache are stored by a packet unit which is a minimum unit of which the encoded data are composed. As described above, the encoded data of the partial image are a part of fragmented encoded data. Therefore, the packets stored in the cache cannot be efficiently utilized.

Further, in JPIP which refers to encoded data of a partial image, a data accessing unit is not a structural element unit but a packet which is a minimum unit of the encoded data. Therefore, when data are accessed by a structural element unit, a required number of packets to form the structural element unit are collected and data are decoded and reproduced by recognizing that necessary packets exist in the cache without a lacking packet. In the recognition of the lacking packet, since the total structure of the packets is unknown, the packets of encoded data cannot be efficiently referred to.

In addition, in JPIP, when encoded data of a partial image are loaded and decoded, since the encoded data are fragmented partial encoded data, cases where all the encoded data exist are few. Since there is a case where the encoded data are partially lacking, efficient access cannot be executed.

SUMMARY OF THE INVENTION

An image processing apparatus and image processing method are described. In one embodiment, an image processing apparatus that loads partial encoded data via a network, comprises an extraction unit to extract layer levels of each packet included in the partial encoded data, an estimation unit to calculate the number of layer levels of each packet based on the layer levels of each packet extracted by the extraction unit and to estimate a greatest layer level of each packet, a writing unit to write the greatest layer level of each packet estimated by the estimation unit in a management table, and a formation unit to form a layer data table in which each layer has the greatest layer level estimated by the estimation unit, wherein the writing unit compares each layer level written in the management table with layer levels of each packet included in newly received partial encoded data, and changes the layer levels of each layer written in the management table to the layer levels of each layer included in the newly received partial encoded data when the layer levels included in the newly received partial encoded data are larger than the layer levels written in the management table.

BRIEF DESCRIPTION OF THE DRAWINGS

Features and advantages of the present invention will become more apparent from the following detailed description when read in conjunction with the accompanying drawings, in which:

FIG. 5 is a diagram showing an example of an output displaying image when JPIP is used;

FIG. 26 is a diagram that explains freely stopping compression and expansion operations of a still image on an arbitrary layer (decomposition level) corresponding to an octave division on DWT of a block base;

DESCRIPTION OF THE PREFERRED EMBODIMENT

Figure 1:
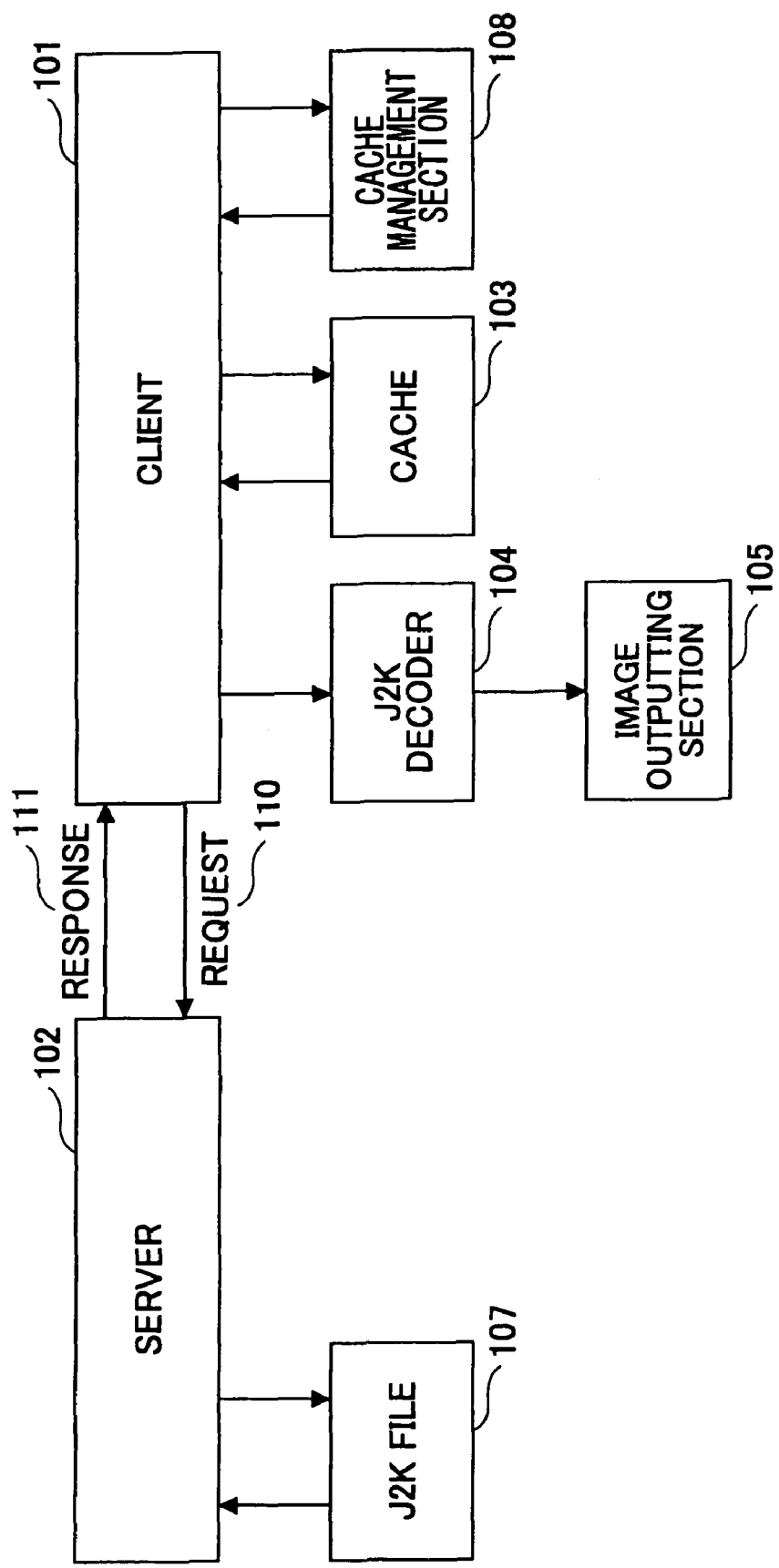
FIG. 1 is a block diagram showing a client/server model in a network in which encoded data are communicated between the client and server according to one embodiment of the present invention.

Embodiments of the present invention include an image processing apparatus and an image processing method in which processing efficiency at the time when encoded data in a specific region of structural encoded data are accessed (referred to or read) can be high by estimating a layer structure of original layer encoded data from fragmented partial encoded data.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image processing apparatus and an image processing method particularly pointed out in the specification in such full, clear, concise, and exact terms as to enable a person having ordinary skill in the art to practice the invention.

To achieve one or more of these and other advantages, according to the present invention, there is provided an image processing apparatus that loads partial encoded data via a network. The image processing apparatus includes an extraction unit to extract layer levels of each packet included in the partial encoded data, an estimation unit to calculate the number of layer levels of each packet based on the layer levels of each packet extracted by the extraction unit and to estimate a greatest layer level of each packet, a writing unit to write the greatest layer level of each packet estimated by the estimating section in a management table, and a formation unit to form a layer data table in which each layer has the greatest layer level estimated by the estimation unit. The writing unit compares each layer level written in the management table with layer levels of each packet included in newly received partial encoded data, and changes the layer levels of each layer written in the management table to the layer levels of each layer included in the newly received partial encoded data when the layer levels included in the newly received partial encoded data are larger than the layer levels written in the management table.

Effect of Embodiments of the Invention

According to one embodiment of the present invention, a layer structure of original encoded data is estimated from fragmented partial encoded data. Therefore, the processing efficiency can be high when encoded data of a specific region are accessed (referred to or read).

In addition, when encoded data are referred to by utilizing an estimated layer structure, the encoded data are managed by layer levels based on the structure of the structural document. Therefore, a lacking packet in the encoded data stored in an encoded data storing device such as a cache can be easily recognized. With this, packets stored in the cache can be efficiently reused. In addition, the lacking packet can be downloaded in an idle time. Further, a decoding process can be efficiently executed by referring to partial encoded data in each structural unit. In addition, in JPIP, accessing partial encoded data can be efficiently executed.

In addition, according to one embodiment of the present invention, as a data structure of layer encoded data stored in a data storing device, the structure of the encoded data is a tree structure, and a pointer to a packet which is a minimum unit of encoded data can be established.

In addition, according to one embodiment of the present invention, encoded data can be accessed (referred to or read) in an encoded data layer level. Therefore, a stored packet can be easily recognized by the encoded data layer level unit and can be easily referred to.

In addition, according to one embodiment of the present invention, a client can receive encoded data in an idle time by background processing; therefore, frequently used encoded data can be received with high priority.

Best Mode of Performing Out the Invention

A best mode of performing the present invention is described with reference to the accompanying drawings.

First, before describing one embodiment of the present invention, the handling of encoded data in JPIP is described.

JPIP is an international standard that describes a protocol. The protocol is between a server and a client and specifies how the client receives only necessary codes from JPEG 2000 codes stored in the server. As a protocol to partially access a layer image, there is IIP (Internet imaging protocol) to access FlashPix in which multi-level resolution of an image is expressed. JPIP is described in Japanese Laid-Open Patent application No. 2004-274758.

In JPIP, a server outputs (responds) a complete image file in which encoded data having a format of a tile-part stream (JPT-stream) or a precinct stream (JPP-stream) are stored to a client based on a request from the client. In the JPT-stream, encoded data of a sub image are output to a client as a group of tile-parts stipulated in Part 1 in JPEG 2000. In the JPP-stream, encoded data of a sub image are output to a client as a group of precincts stipulated in Part 1 in JPEG 2000. When encoded data sequentially accessed by the JPT-stream are reproduced (decoded), the encoded data are sequentially reproduced completely in each tile region divided into tiles. When encoded data sequentially accessed by the JPP-stream are reproduced, the encoded data can be gradually reproduced in a small region (precinct) unit in a wide region extending the tile regions. That is, in the reproduction by the access of the JPT-stream, the region reproduced at one time is limited to a tile region in the total image; however, in the reproduction by the access of the JPP-stream, the region reproduced at one time is not limited to the tile region in the total image and the total image can be reproduced.

As described above, the client in JPIP can recognize a part of the received encoded data and can form an image by decoding the part, and can have a function that reproduces a sub set of a code stream in JPEG 2000 by the JPT-stream format or the JPP-stream format.

That is, the encoded data of the JPP-stream can be decoded by a JPEG 2000 decoder by being converted into a JPEG 2000 code stream. The conversion can be executed when all main headers and all tile headers are received together with data to be decoded.

Figure 23:
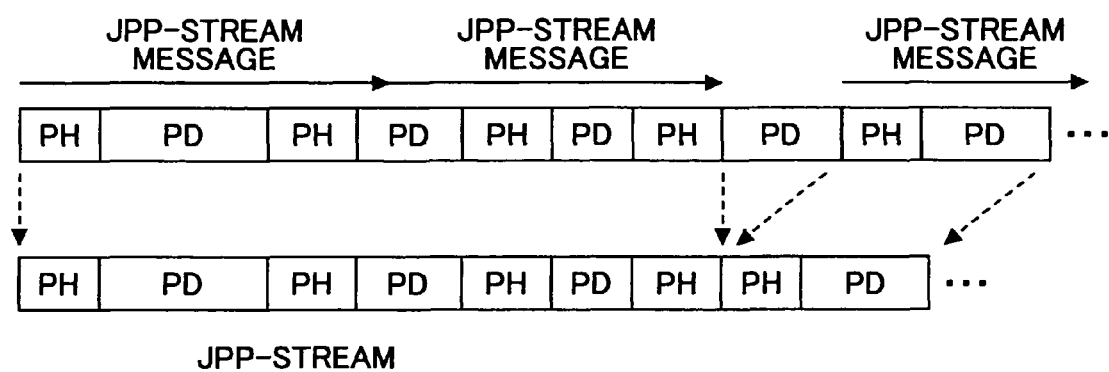
FIG. 23 is a diagram showing a relationship between a precinct data bin and a JPP-stream message.

FIG. 23 is a diagram showing a relationship between a precinct data bin and a JPP-stream message. As shown in FIG. 23, the JPP-stream is composed of a sequence of JPP-stream messages. The JPP-stream message has a data bin information format (main header, meta data, precinct, or tile header). The JPP-stream message also shows the starting position in the data bin and the length of the message. The JPP-stream message also has a format, an index in the format, an offset of the message to a data bin having the format and the index, and a header to distinguish the message length. The JPP-stream message does not include all of data bins but includes a part of the data bins. The JPP-stream message includes an identifier for identifying the tile, component, position, and resolution for which the data bin is. In one embodiment of the present invention, the tile, the component, the position, and the resolution are layers, and packets included in the data bin correspond to information of data to which layer level the data belong. For example, a packet included in a data bin corresponds to a tile A, a component Cb, a position 4, and a resolution level 1 (these are not shown in drawings). In FIG. 23, in a JPP-stream message, packet headers (PH) and packet data (PD) are shown.

Figure 24:
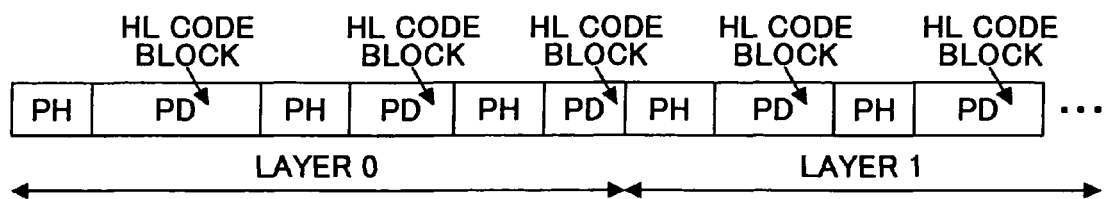
FIG. 24 is a diagram showing a precinct data bin.
Figure 25:
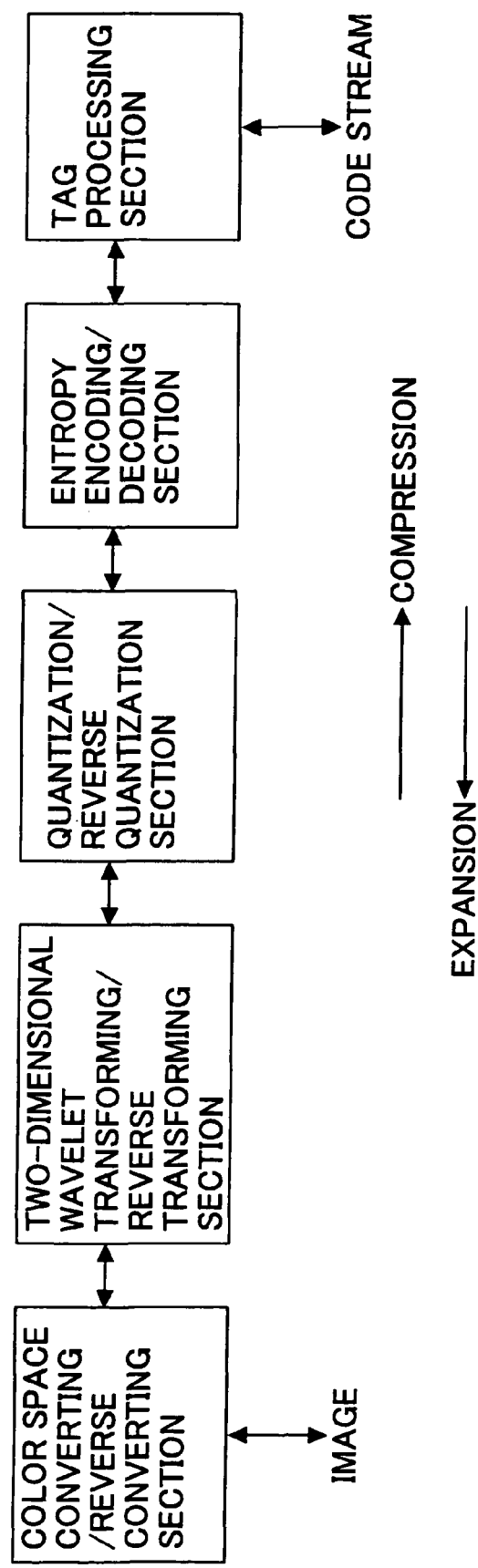
FIG. 25 is a block diagram for forming a layer encoding algorithm which is the basis of JPEG 2000.
Figure 27:
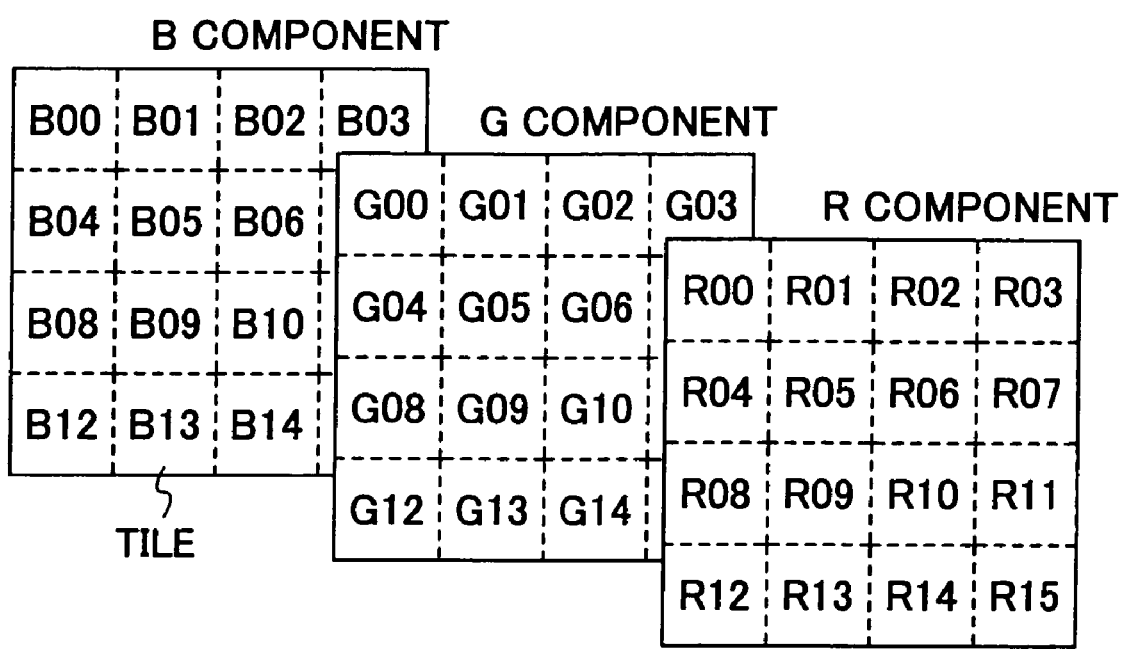
FIG. 27 is a diagram in which each component of an original image is divided into plural rectangular tiles.
Figure 28:
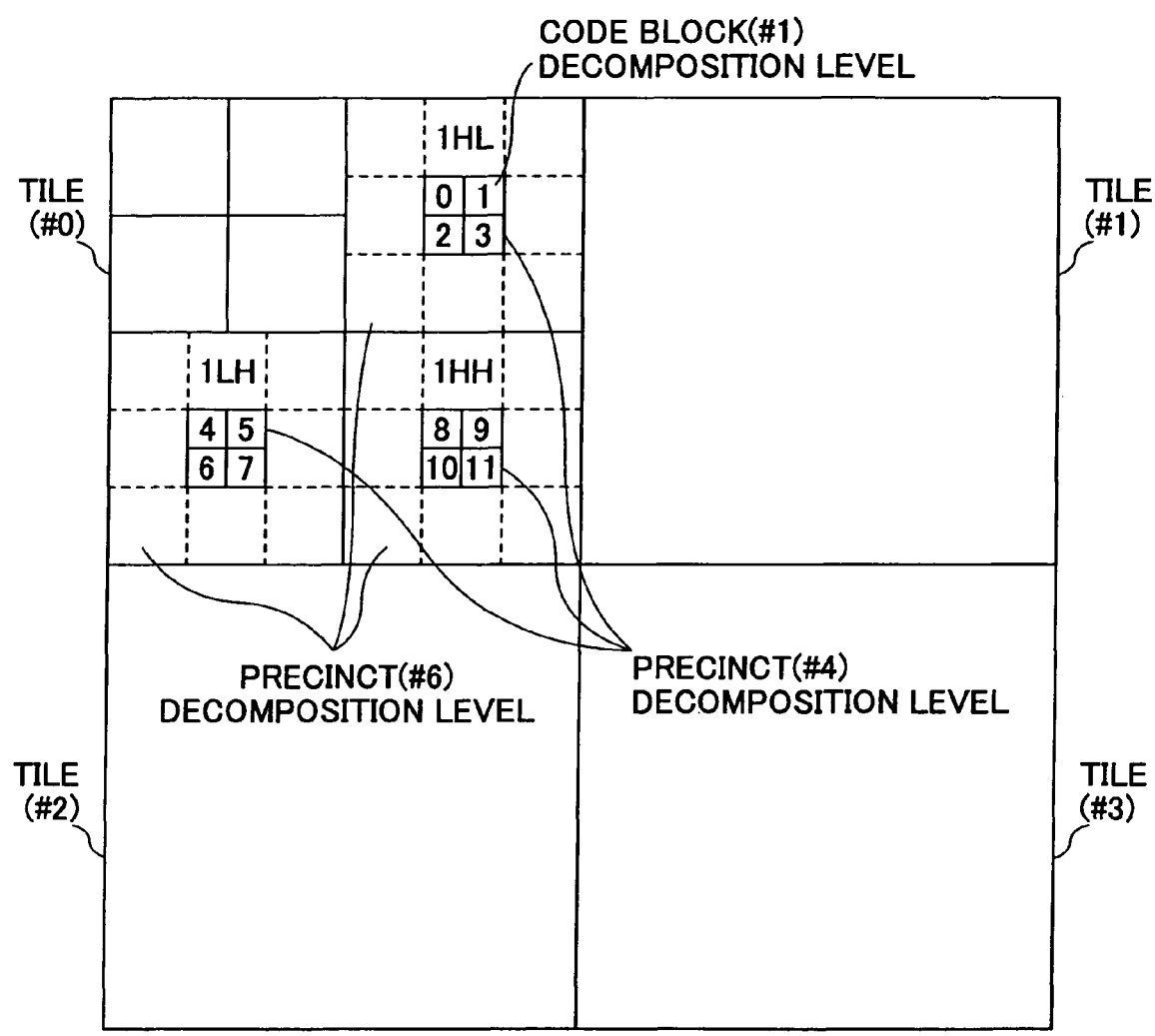
FIG. 28 is a diagram showing precincts each of which is formed by three rectangular regions whose spaces are matched with each other.
Figure 29:
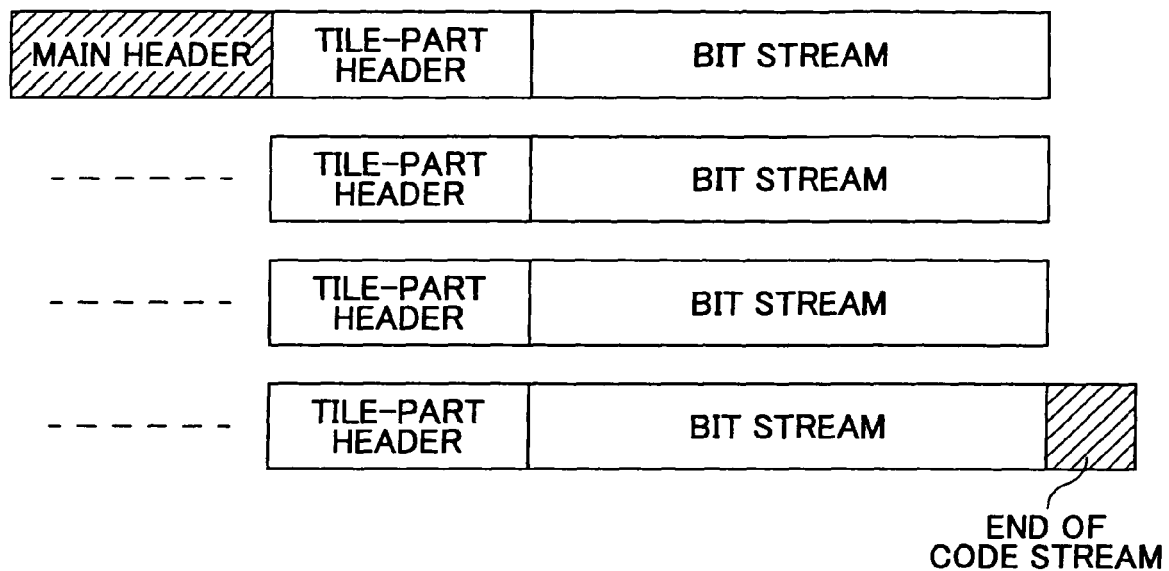
FIG. 29 is a diagram showing a structure of a code stream.

FIG. 24 is a diagram showing a precinct data bin. As shown in FIG. 24, the precinct data bin is composed of packet headers (PH) and packet data (PD). The packet header (PH) includes information about which code block has data in a packet data part of a packet, information of the byte number stored in each code block, and the number of encoded paths of each code block.

In the standard specifications of JPIP, the packet header does not have information (layer level information) of a component, a position, resolution, a tile, or information of a layer to which the component, the position, the resolution, and the tile belong. However, in one embodiment of the present invention, the layer level information of each packet can be recorded in the packet header by analyzing the above described message data. In addition, a client can record the layer level information after receiving the JPP-stream message.

Further, the standard specifications of JPIP do not have information of the length of the packet data. The length of the packet data can be determined by adding the lengths of data in all the code blocks in the packet. In one embodiment of the present invention, the calculated result of the length of data can be stored in the packet data, and the packet can be extracted from the structure stipulated in the JPP-stream.

The protocol of JPIP has two different types of requests, that is, a stateless request that a server does not need to maintain a cache model and a request except the stateless request. In the cache model of the server, information which the server sends data to a client is recorded. In a cache of the client, encoded data received from the server are stored, and the server can reuse the encoded data by using the cache model without resending the encoded data to the client. The client stores encoded data of JPEG 2000 fragmentarily received from the server in the received order in the cache by appending. The client forms a bit stream stipulated by the syntax of JPEG 2000 from the encoded data in the cache and decodes the bit stream.

Next, one embodiment of the present invention is described in detail.

FIG. 1 is a block diagram showing a client/server model in a network in which encoded data are communicated between the client and server according to one embodiment of the present invention.

As shown in FIG. 1, a server 102 is connected to at least one client 101 via a network. The client 101 issues a request 110 for a subset of an image to the server 102 and receives a response 111 including encoded data based on a description in the request 110 from the server 102.

Depending on the bandwidth of the network between the server 102 and the client 101, a resource of the server 102, and a structure of the request 110, the client 101 can receive almost all the encoded data of the image. The client 101 issues a request 110 for the part of the encoded data that it lacks by using a cache 103 and receives an additional part ("the lacking part") of the encoded data.

In FIG. 1, the server 102 provides a J2K file 107, and the client 101 provides a J2K decoder 104, an image outputting unit 105, the cache 103, and a cache management unit 108.

One of the fundamental features of JPIP is to avoid the client 101 receiving the received data again. There are two methods to avoid transmitting the same encoded data from the server 102 to the client 101 again.

In a first method, the client 101 has information of the received encoded data and does not request the server 102 to resend the received encoded data. Then, the server 102 does not resend the encoded data received at the client 101. When the server 102 operates in the stateless mode, the server 102 operates without storing previous mutual operations with the client 101. Since the server 102 does not need to maintain a specific cache model storing the previous mutual operations, generally, the server 102 operates in the stateless mode.

Figure 2:
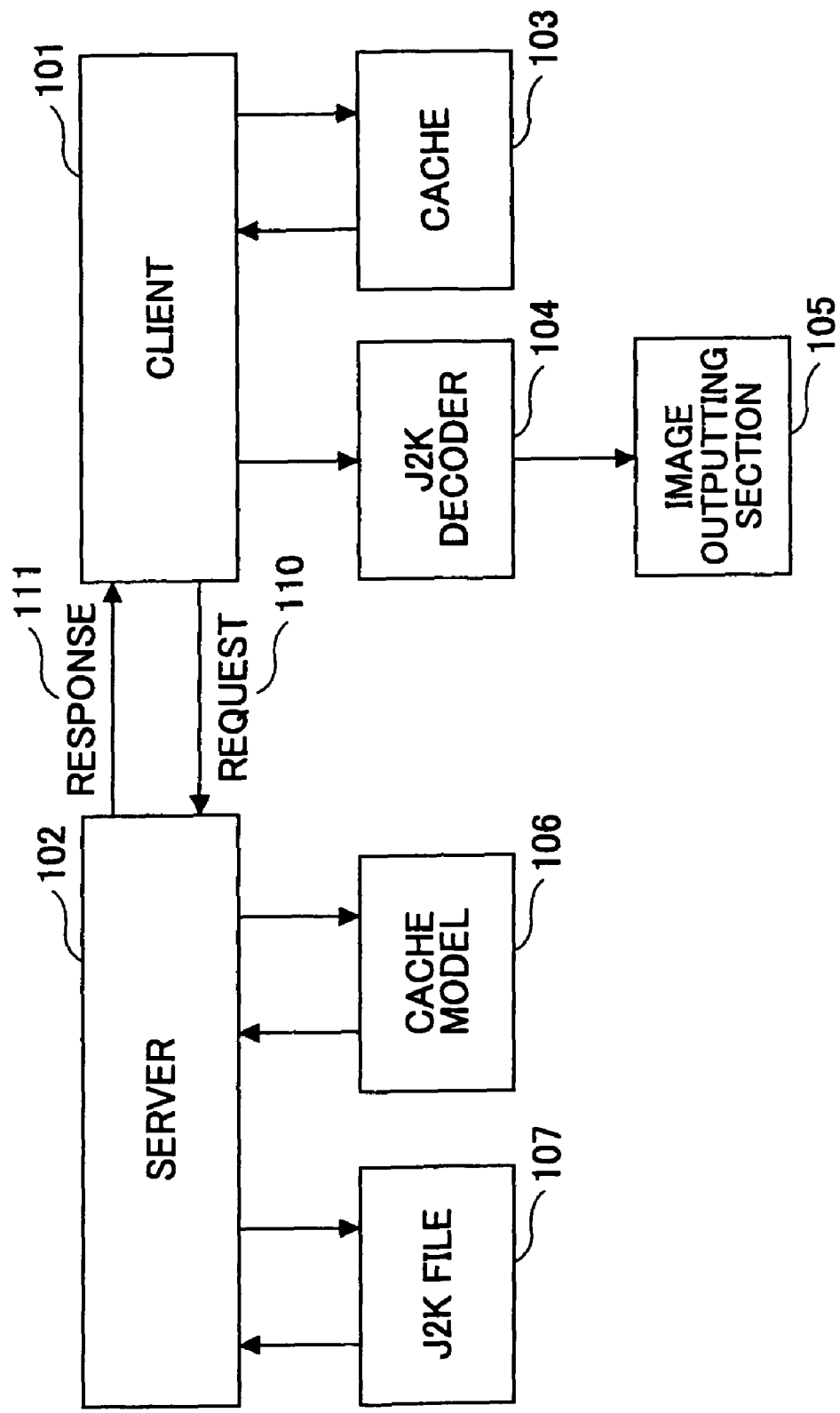
FIG. 2 is a block diagram showing another client/server model in a network in which the server provides a cache model.

FIG. 2 is a block diagram showing another client/server model in a network in which the server provides a cache model.

In a second method, as shown in FIG. 2, the client 101 and the server 102 establish "a session", and the server 102 provides a cache model 106 for storing encoded data sent to the client 101. That is, in the cache model 106 of the server 102, information that the server 102 sends to the client 101 is stored. The encoded data sent from the server 102 are stored in the cache 103 of the client 101, and the encoded data sent to the client 101 are stored in the cache model 106 of the server 102. Therefore, the server 102 can reuse the encoded data sent to the client 101 without resending the encoded data sent to the client 101, and also the client 101 can reuse the encoded data received from the server 102. As described above, the client 101 stores the encoded data of JPEG 2000 fragmentarily received from the server 102 in the received order in the cache 103 by appending. The client 101 forms a bit stream stipulated by the syntax of JPEG 2000 from the encoded data in the cache 103 and decodes the bit stream.

In one embodiment of the present invention, the client/server model that processes a stateless request is used, and as described above, in FIG. 1, the client 101 provides the cache management unit 108. The cache management unit 108 manages data in the cache 103.

Even before the client 101 receives all the encoded data previously requested from the server 102, the client 101 can change encoded data of a part of an image designated by a user. In addition, the server 102 can stop the response for a previous request in order to handle the change.

Figure 3:
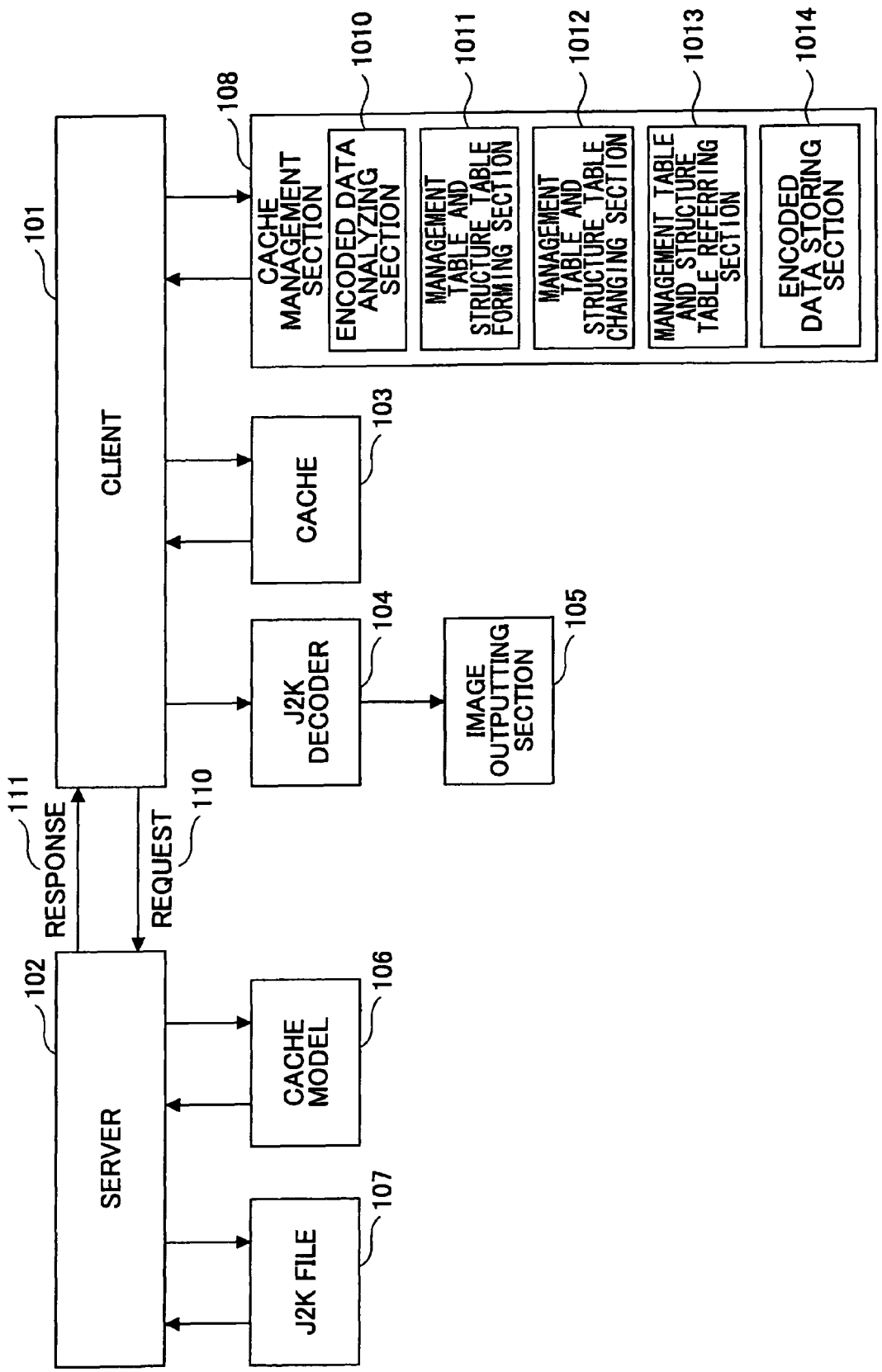
FIG. 3 is a block diagram showing the client/server model shown in FIG. 1 in which a cache management section is described in detail.

FIG. 3 is a block diagram showing the client/server model shown in FIG. 1 in which the cache management unit 108 is described in detail. As shown in FIG. 3, in order to manage packets on the cache 103, the cache management unit 108 provides an encoded data analyzing section 1010, a management table and structure table forming unit 1011, a management table and structure table changing unit 1012, a management table and structure table referring section 1013, and an encoded data storing unit 1014.

Figure 4:
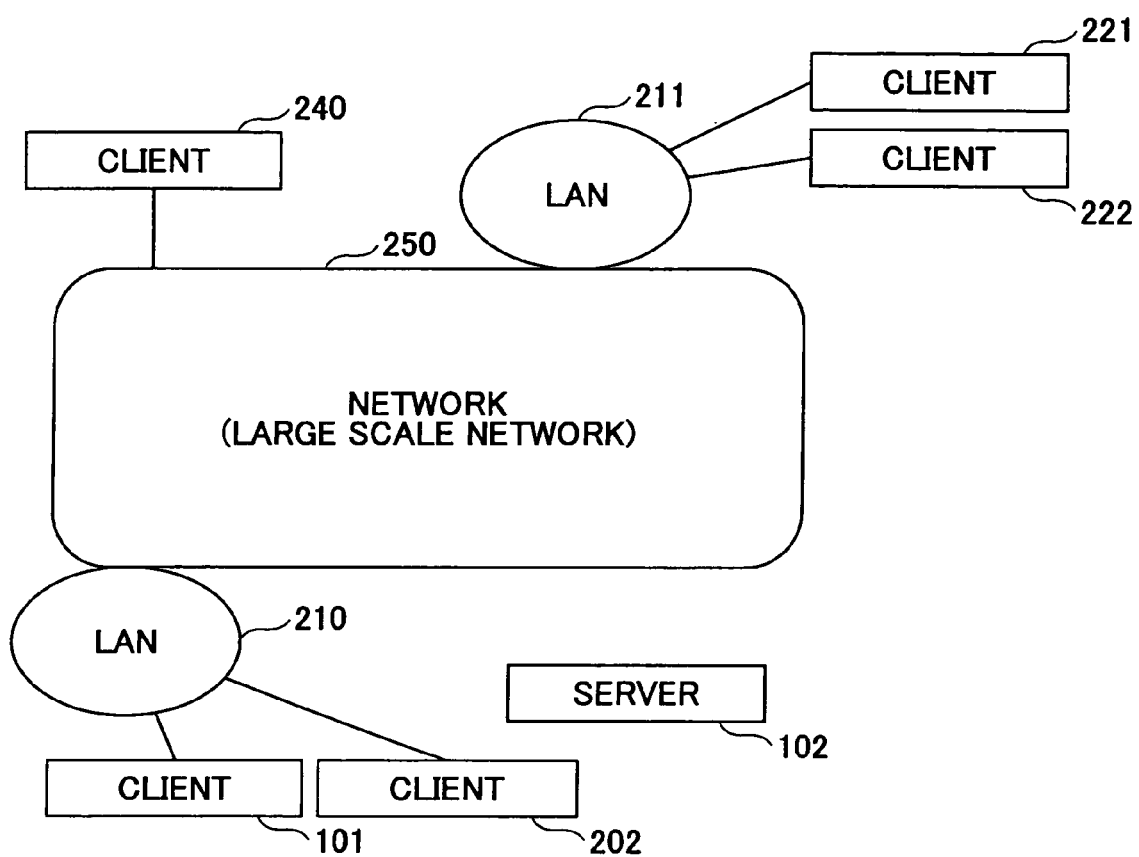
FIG. 4 is a block diagram showing a network model including a client/server model according to one embodiment of the present invention.

FIG. 4 is a block diagram showing a network model including a client/server model according to one embodiment of the present invention. As shown in FIG. 4, a network 250 (large scale network) includes plural clients 101, 202, 221, 222, and 240 and a server 102. In FIG. 4, one server 102 is shown; however, plural servers can be connected to the network 250. The server 102 can handle a different part of an image in millions of different clients. A client receives an image and data (for example, HTML pages), from plural servers. In addition, in order to make a quick response possible to several requests from clients without communicating with an original server, a proxy server can be in the network model. Effective bandwidth and cost of the bandwidth are changed between a client to a server and a different client to the server, and between different servers.

The most popular network which is generally used is the Internet using WWW. However, a LAN (local area network) or a network having a mutually connecting function can be used in JPIP. JPIP is most generally used on HTTP and also used with a transfer protocol including TCP/IP and UDP.

In FIG. 4, the clients 101 and 202 are connected to the network 250 via an LAN 210, and the clients 221 and 222 are connected to the network 250 via an LAN 211.

When a code format (message) of a JPIP stream is analyzed, the number of levels of each layer of which layer encoded data are composed such as the number of components, the number of layers, the size of precincts, and the divided number of decompositions can be obtained. In addition, the progression order can be obtained.

FIG. 5 is a diagram showing an example of an output displaying image when JPIP is used. As shown in FIG. 5, data composed of two tiles are displayed on the uppermost screen, and when each tile is, for example, clicked, image data are displayed, and an image composed of four tiles with degraded image quality is displayed as shown in the middle of FIG. 5. Further, when the right lower position is clicked, the resolution of a partial image of the tile is variably expanded and the image quality of the partial image is increased. As described above, JPIP is used to refer to partial image data. Every time when partial image data are referred to, a client requests a server to transfer encoded data and the client reproduces (decodes) the encoded data.

As described above, in JPIP, there is a premise that a client needs partial encoded data instead of all encoded data.

Next, a format of a code stream in JPEG 2000 is described. The code stream in JPEG 2000 includes data where entropy encoding is applied to an image and data describing a method to decode the encoded data. In addition, the code stream includes information of wavelet transformation which is used, the size of tiles, the size of precincts, resolution information, and the order of packets in a file. Further, the code stream must include all parameters that are needed to decode encoded data to which the entropy encoding is applied. The code stream can include information such as the packet length to access encoded data at high speed.

Figure 6:
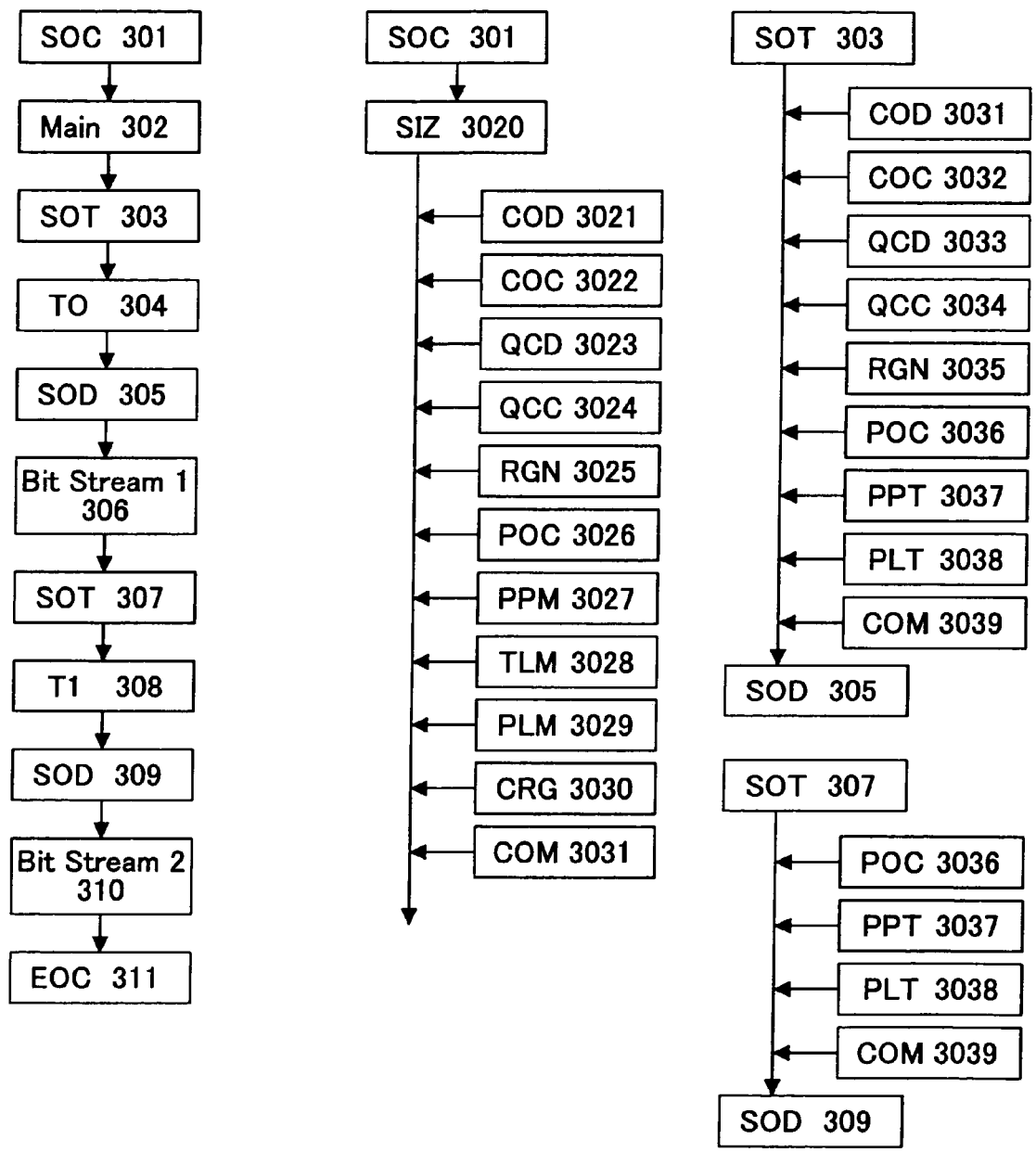
FIG. 6 is a diagram showing an outline of a format of a code stream in JPEG 2000.

FIG. 6 is a diagram showing an outline of the format of the code stream in JPEG 2000. As shown in FIG. 6, the code stream in JPEG 2000 has several marker segments. A marker segment is composed of a marker having two-byte length and a group of parameters incidental to the marker. A function, usage, and the data length are expressed in each marker segment. The format of the code stream starts with an SOC (start of code-stream) showing the start of encoded data. After the SOC marker, a main header containing descriptions of encoding parameters and quantization parameters follows, and encoded data follow after the main header.

As shown in the middle of FIG. 6, the main header is composed of essential marker segments of a COD (coding style default) and a QCD (quantization default), and optional maker segments of a COC (coding style component), a QCC (quantization component), an RGN (region of interest), a POC (progressive order change), a PPM (packed packet headers, main header), a TLM (tile-part length), a PLM (packet length, main header), a CRG (component registration), and a COM (comment).

In this, in a SIZ marker segment, information of the width and the length of an image component is included, in which information image information such as the number of components and the tile size at the time of non-compression is described. In the COD segment and the COC segment, parameters of how the compressed data are decoded are included. In the COD marker segment, the order of progressions, the number of layers, the size of precincts, and the divided number of decompositions are described. Information of quantization is described in the QCD marker segment. The COM marker segment is utilized when information such as a comment is desired to be added, and can be used in both the main header and the tile header.

After the main header, a sequence of tile-parts follows. Each tile-part starts with an SOT marker segment which distinguishes a specific tile from a part of the tile. Encoded data of each tile-part start with an SOT marker segment. The SOT marker segment includes information of the number of tile-parts. Tile headers in the right side of FIG. 6 are described below in detail, and the description in the left side of FIG. 6 is omitted. Further, in FIG. 6, numerals after each marker segment are omitted in the description.

Figure 7:
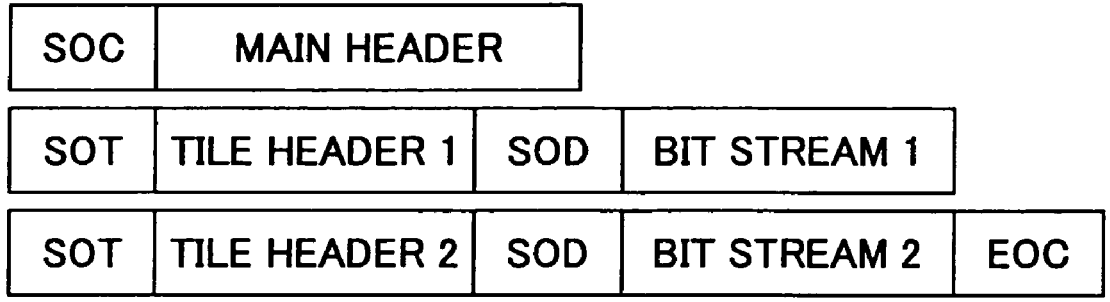
FIG. 7 is a diagram showing an example of a code stream in JPEG 2000.

FIG. 7 is a diagram showing an example of a code stream in JPEG 2000.

As shown in the middle of FIG. 7, the encoded data starts with an SOT (start of tile-part) marker segment, and is composed of the SOT marker segment, a tile header, an SOD (start of data) marker segment, and tile data (bit stream). After the encoded data corresponding to the total image, an EOC (end of code-stream) marker segment showing the end of the encoded data is added, as shown in the lower part of FIG. 7. As described above, the main header is composed of the essential marker segments of the COD and the QCD, and the optional maker segments of the COC, the QCC, the RGN, the POC, the PPM, the TLM, the PLM, the CRG, and the COM. In FIG. 7, at the uppermost position, the SOC marker segment and the main header are shown.

In the right side of FIG. 6, two formats of the tile headers are shown. In the right upper side of FIG. 6, a marker segment string that is attached to the head of tile data is shown. The COD, the COC, the QCD, the QCC, the RGN, the POC, the PPT, and the COM marker segments can be used as the marker segment string. In the right lower side of FIG. 6, a marker segment string that is attached to the head of a tile-part when a tile is divided into plural parts is shown. The POC, the PPT, the PLT, and the COM marker segments can be used as the marker segment string. In the tile header, all segments are not essential but optional.

The tile data are composed of a sequence of packets. The order of packets in a code stream is called the progression order.

When the format of the code stream in JPEG 2000 is analyzed, the number of layer levels of each layer, which is composed of encoded data, can be obtained, where encoded data of each layer are the number of components, the number of layers, the size of precincts, the divided number of decompositions, and so on. In addition, the progression order can be obtained.

Next, processes for estimating the layer structure of encoded data are described by using fragmented packets of which the encoded data are composed.

Figure 8:
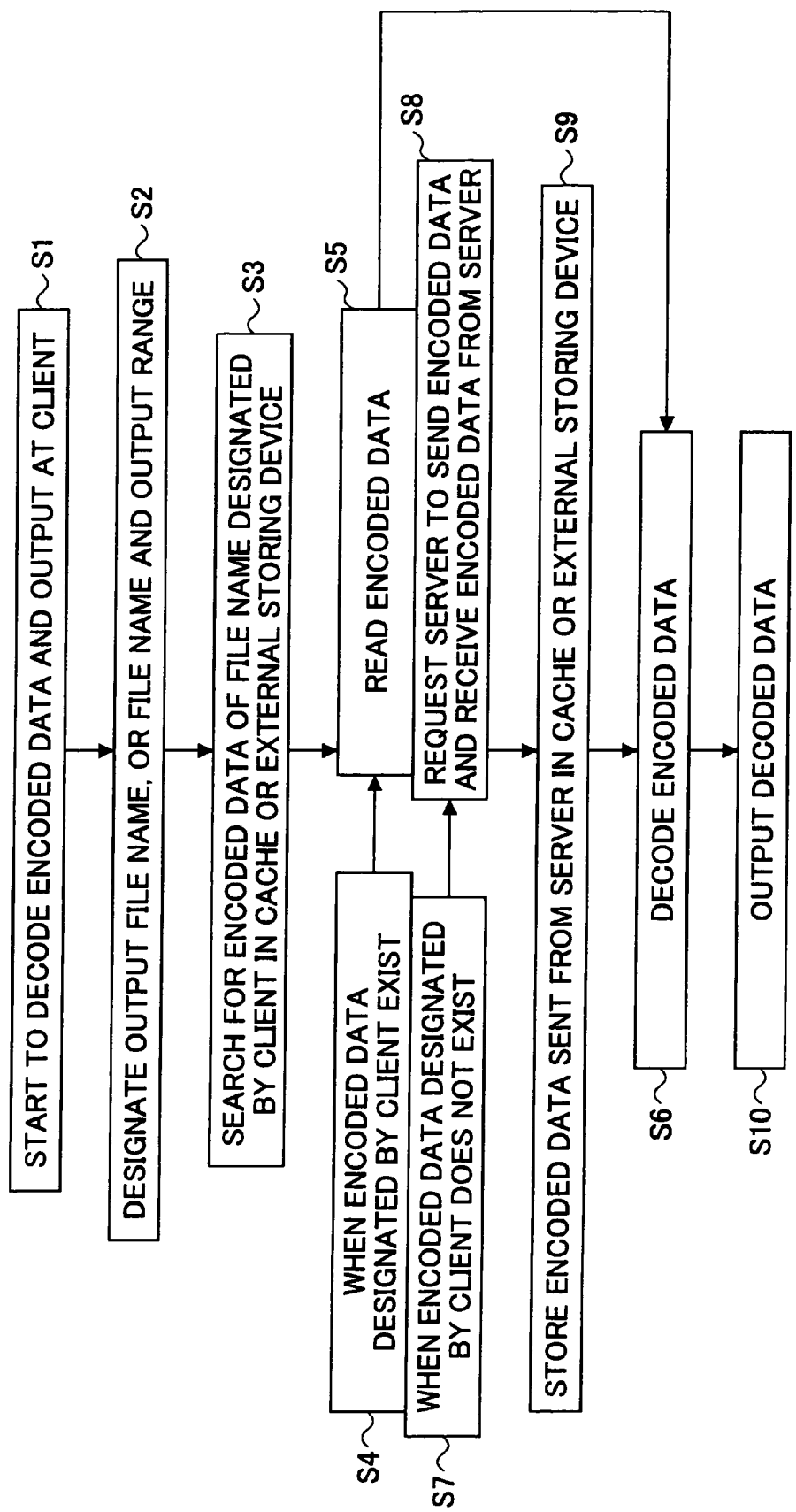
FIG. 8 is a flowchart showing processes of cache management according to one embodiment of the present invention.

FIG. 8 is a flowchart showing processes of cache management according to one embodiment of the present invention. The cache management is executed by the cache management section 108.

First, the client 101 starts to decode encoded data and outputs the decoded data (S1). The client 101 designates an output file name, or a file name and an output range of the file (S2). The cache management unit 108 searches for encoded data of the file name designated by the client 101 in the cache 103 or an external storing device (not shown) (S3). When the encoded data of the file name designated by the client 101 exist (S4), the encoded data are read (S5), and the client 101 decodes the encoded data (S6). The client 101 outputs the decoded data (S10).

When the encoded data of the file name designated by the client 101 do not exist in the cache 103 or the external storing device (S7), the client 101 requests the server 102 to send (download) the encoded data and receives the encoded data from the server 102 (S8). The client 101 stores the received encoded data in the cache 103 or the external storing device (S9). The client 101 decodes the encoded data (S6) and outputs the decoded data (S10).

There is a case that almost all the encoded data designated by the client 101 exist in the cache 103; however, a part of packets of which the encoded data are composed does not exist. In this case, generally, the client 101 requests the server 102 to send only the part of packets which does not exist in the cache 103. However, in this case, in one embodiment of the present invention, the client 101 can request the server 102 to send all the packets.

Next, estimation of the structure of encoded data by using a group of fragmented packets is described.

Figure 9:
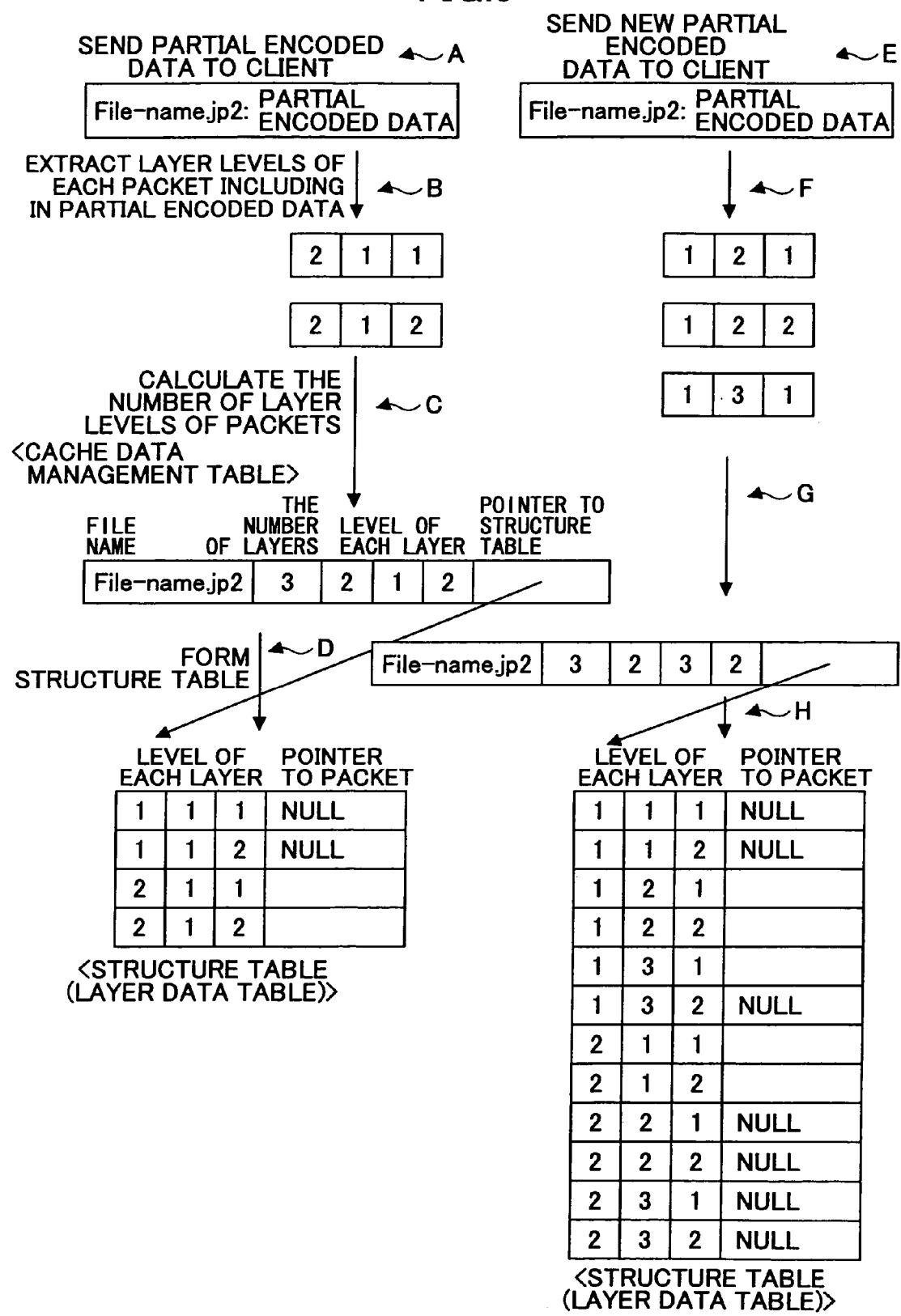
FIG. 9 is a conceptual diagram for estimating a structure of encoded data by using a group of fragmented packets.

FIG. 9 is a conceptual diagram for estimating the structure of encoded data by using a group of fragmented packets.

First, in A of FIG. 9, the server 102 sends partial encoded data to the client 101. The partial encoded data are layer encoded data, for example, a JPEG 2000 code stream, or a JPIP stream.

Next, in B of FIG. 9, the client 101 extracts layer levels of each packet including in the partial encoded data. When the partial encoded data are a JPEG 2000 code stream or a JPIP stream, the layer levels can be calculated by referring to data in the stream. In FIG. 9, two packets are shown; in one packet, the first layer is level 2, the second layer is level 1, and the third layer is level 1. In another packet, the first layer is level 2, the second layer is level 1, and the third layer is 2.

Next, in C of FIG. 9, the number of the layer levels of the packets is calculated (estimated) based on the layer levels including in the above partial encoded data, and a greatest layer level of each packet is estimated.

Next, in D of FIG. 9, the greatest layer level of the packet is written in a management table (cache data management table) of the client 101. A layer data table (structure table) is formed in order to have the greatest layer level. Next, the packets are stored in the cache 103 and a pointer to the packet is written. In the item of the structure table (layer data table) where the pointer of the packet is written, the initial value is NULL, and the packet in which encoded data do not exist becomes NULL.

Next, in E of FIG. 9, the server 102 sends new partial encoded data to the client 101. After this, in F of FIG. 9, the client 101 extracts layer levels of each packet included in the new partial encoded data. In FIG. 9, three new packets are received at the client 101.

Next, in G of FIG. 9, the number of the layer levels of the packets are estimated (calculated) based on the layer levels including in the new partial encoded data and a greatest layer level of each packet is estimated. When a layer level of a packet of the new partial encoded data is larger than that stored in the cache data management table, the cache data management table is renewed by including the layer levels of the packets of the new partial encoded data. In the case of FIG. 9, the second layer is level 3 and is larger than that stored in the cache data management table; therefore, the layer level is raised to 3.

Next, in H of FIG. 9, the greatest layer level of the packet is written in the cache data management table of the client 101. A layer data table (structure table) is formed in order to have the greatest layer level.

As described above, the structure of the encoded data can be estimated from the packets including in the partial encoded data. That is, structural information can be sequentially renewed in one embodiment of the present invention.

Figure 10:
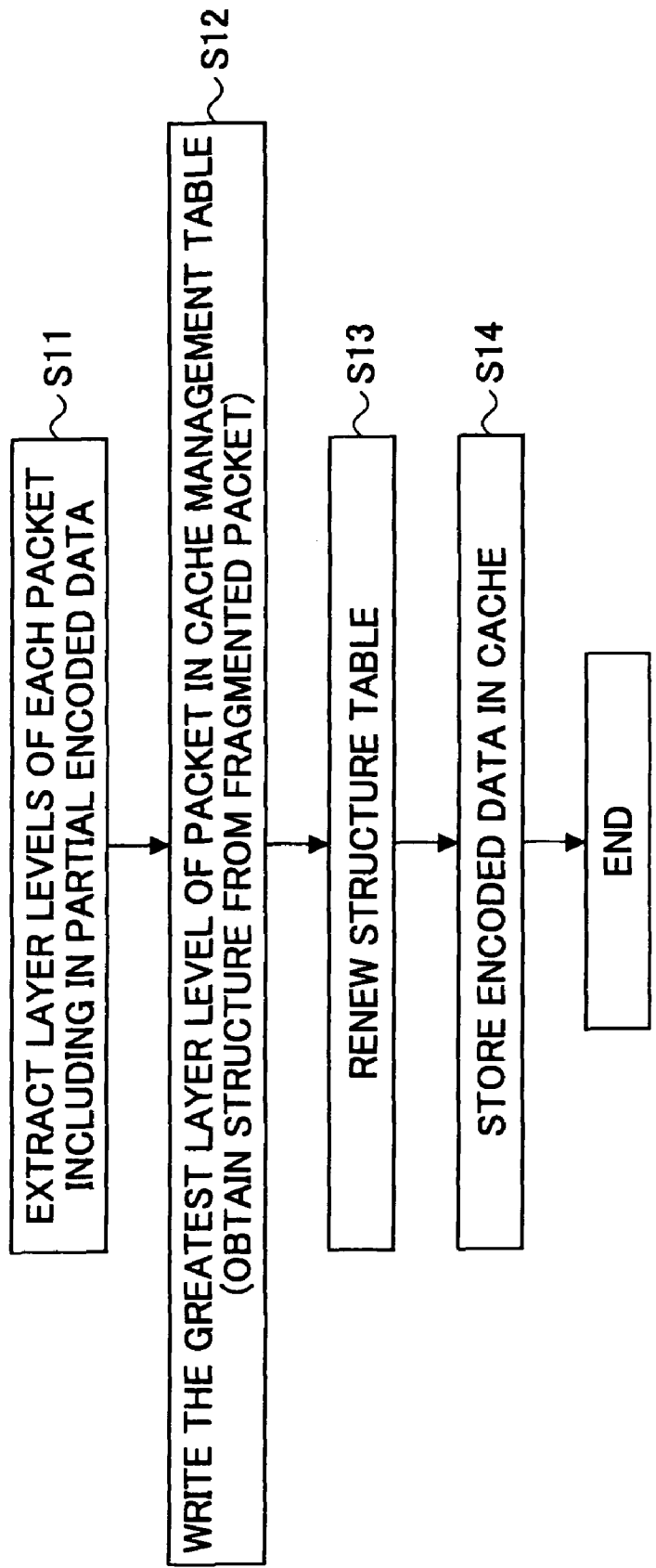
FIG. 10 is a flowchart showing processes for renewing data in a cache according to one embodiment of the present invention.

FIG. 10 is a flowchart showing processes for renewing data in the cache 103 according to one embodiment of the present invention. In the processes, estimation of the structure of the encoded data is included, and the layer level of each layer of the packets is investigated. The greatest value of the layer level is estimated to be the greatest layer level.

In FIG. 10, first, layer levels of each packet including partial encoded data are extracted (S11), the greatest layer level of the packet is written in the cache data management table (obtain a structure from a fragmented packet) (S12), the structure table is renewed (S13), and the encoded data are stored in the cache 103 (S14).

As described above in FIG. 3, in order to manage the packets on the cache 103, the cache management section 108 provides the encoded data analyzation unit 1010, the management table and structure table formation unit 1011, the management table and structure table changing unit 1012, the management table and structure table reference unit 1013, and the encoded data storage unit 1014.

The encoded data analyzation unit 1010 analyzes encoded data and extracts information of packets (the number of layers of each packet and the level of each layer) necessary for estimating the structure. As described in FIG. 9, the management table and structure table forming unit 1011 forms the management table (cache data management table) and the structure table (layer data table) based on information of each packet (the layer levels of the packets including in the partial encoded data). At this time, the packets are stored in the encoded data storage section 1014.

Figure 11:
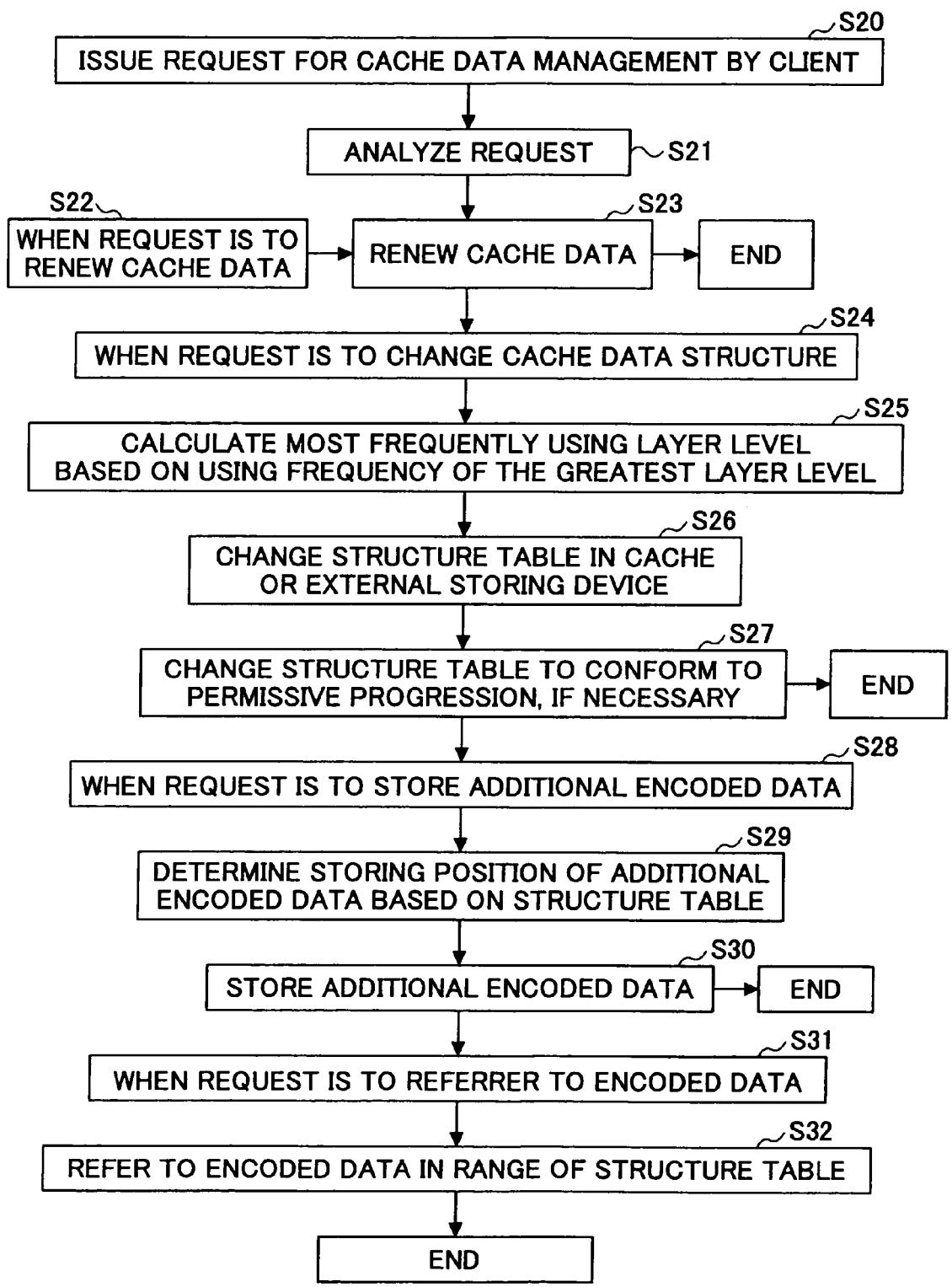
FIG. 11 is a flowchart showing processes for managing cache data according to one embodiment of the present invention.

FIG. 11 is a flowchart showing processes for managing cache data according to one embodiment of the present invention. In the processes, the following sections are operated. The sections are the management table and structure table formation unit 1011, the management table and structure table changing unit 1012, the management table and structure table reference unit 1013, and the encoded data storage unit 1014.

First, when the client 101 issues a request for cache data management (S20), the request for the cache data management is analyzed (S21). When the request is to renew the cache data (S22), the cache data are renewed (S23). Next, when the request is to change a cache data structure (S24), a most frequently used layer level is calculated based on the using frequency of the greatest layer level of the packet (S25). Then, the structure table (structure data) in the cache 103 or the external storing device are changed (S26), and the structure table is changed to conform to the permissive progression of a decoding process, if necessary (S27). Next, when the request is to store additional encoded data (S28), a storing position of the additional encoded data is determined based on the structure table (S29), and the additional cache data are stored in the cache 103 (S30). When the client 101 requests to refer to the encoded data (S31), the client 101 refers to encoded data in the range of the structure table (S32).

Next, structure management of cache data is described. As one of features in one embodiment of the present invention, the cache data management table and the structure table are formed by estimating the layer structure of the encoded data.

Figure 12:
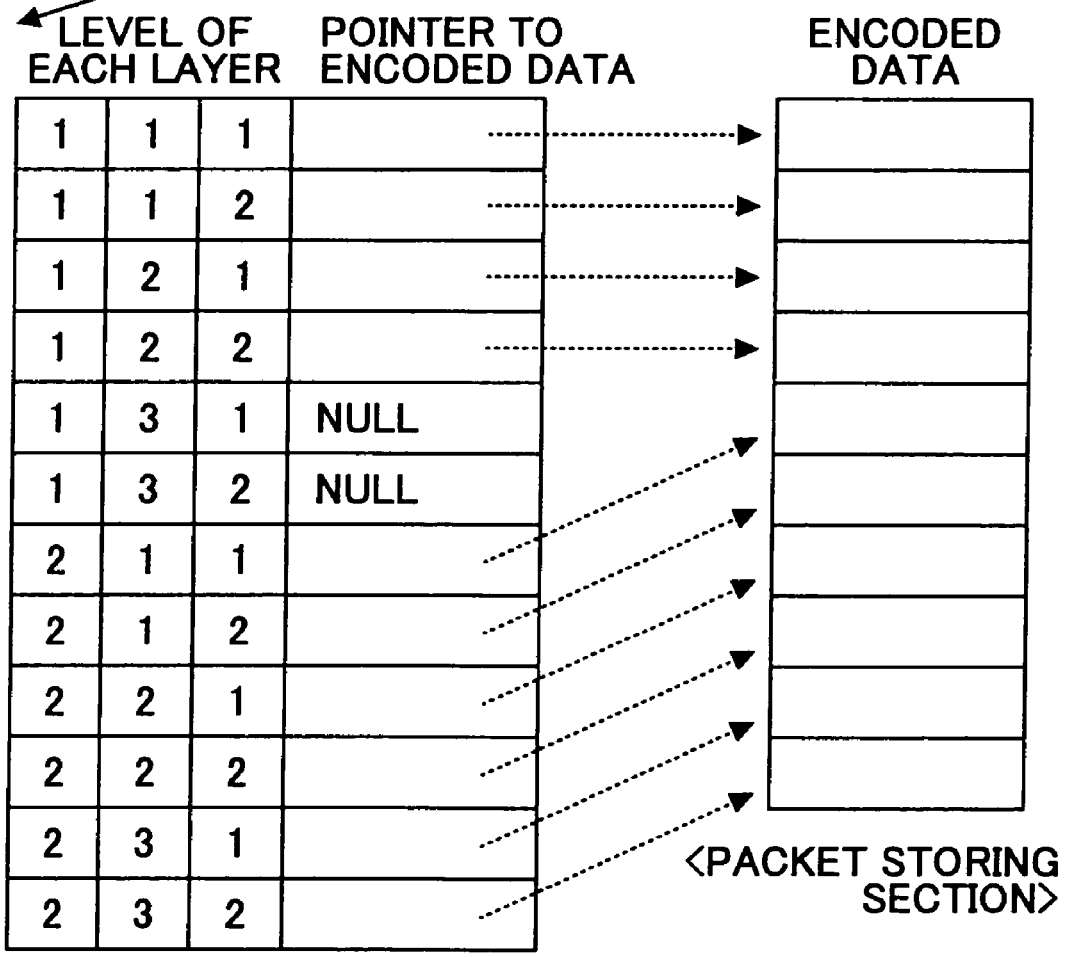
FIG. 12 is a basic diagram showing a data structure for managing cache data (packet structure) according to one embodiment of the present invention.

FIG. 12 is a basic diagram showing a data structure for managing cache data (packet structure) according to one embodiment of the present invention. The data structure for managing cache data (packet structure) is composed of a management table (cache data management table), a structure table, and a packet storing unit. In the present embodiment, the structure table has a table structure; however, the structure table can have a tree structure, and the tree structure is described below in FIG. 15. The management table is composed of an encoded data name (file name), the number of layers, a layer level of each layer (including the greatest layer level), and an address to the structure table (pointer).

The structure table includes combinations of the layer level numbers, and the packet is stored in the part of the pointer to encoded data which packet corresponds to the combination of the level numbers.

Figure 13:
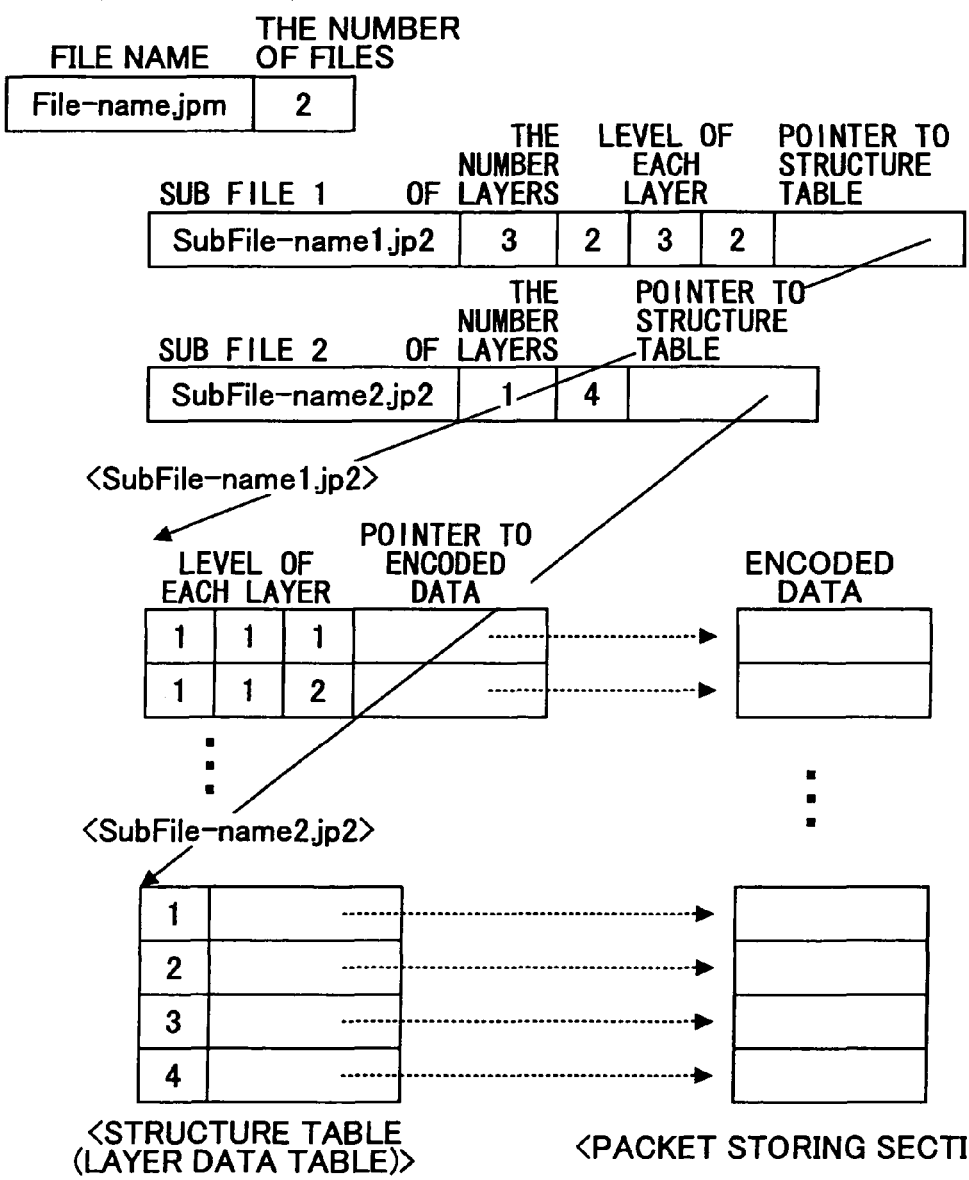
FIG. 13 is a diagram showing another data structure for managing cache data according to one embodiment of the present invention.

FIG. 13 is a diagram showing another data structure for managing cache data according to one embodiment of the present invention. In FIG. 13, the management table is composed of plural sub files, and the structure table is also composed of plural sub files.

When a structural document image in which image data of, for example, a picture pattern are embedded in a document image is encoded, there is a case where encoded data have a layer structure. In this case, the data structure for managing cache data is realized so that the management table has a layer structure corresponding to a layer relationship of encoded data. That is, the management table has sub files. In this case, since each sub file has an independent structure table, the relationship among packets can be managed, and the present embodiment can be applied to the structural document image.

Figure 14:
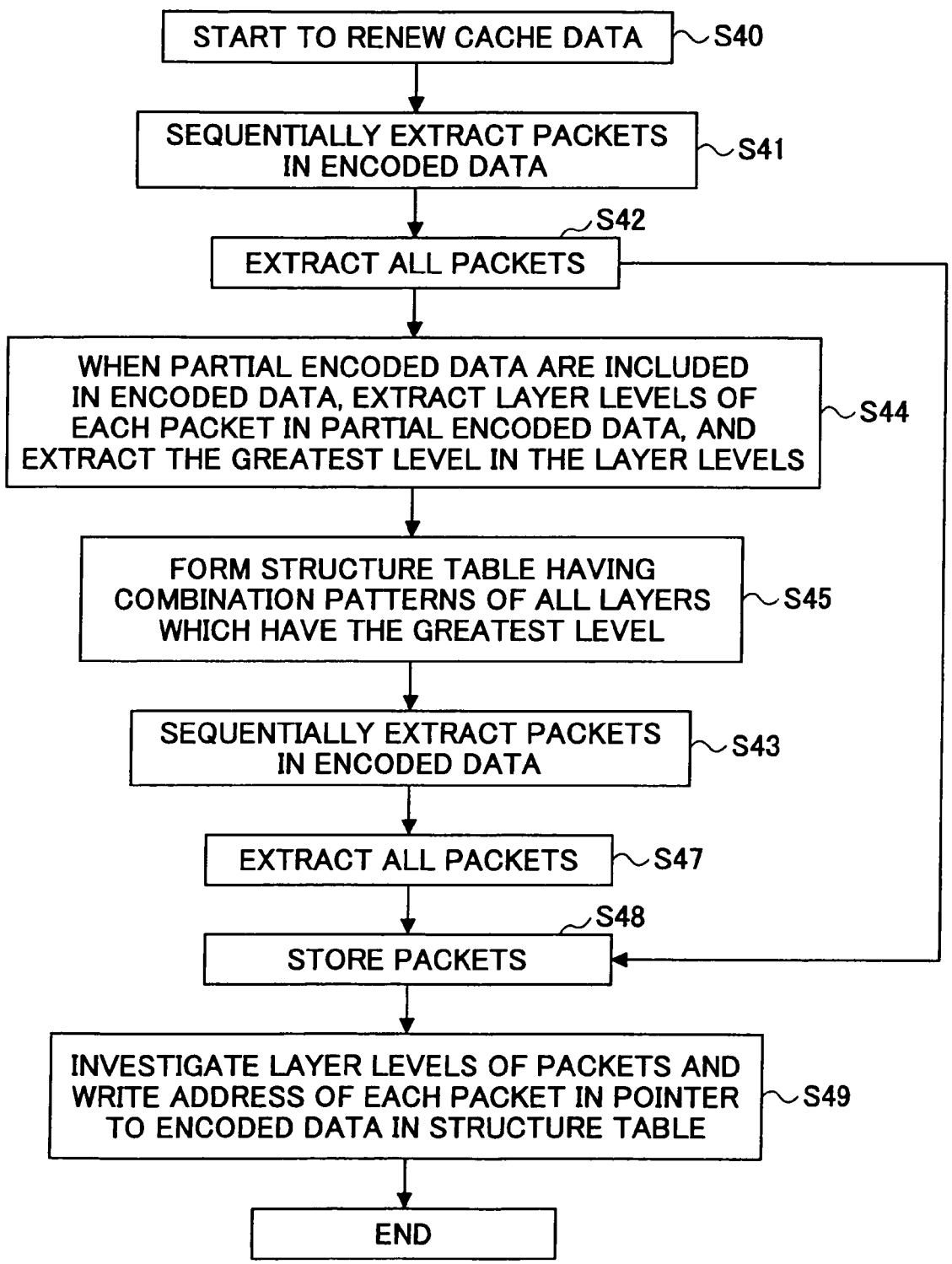
FIG. 14 is a flowchart showing processes for structuring cache data according to one embodiment of the present invention.

FIG. 14 is a flowchart showing processes for structuring cache data according to one embodiment of the present invention.

In FIG. 14, first, when the client 101 starts to renew cache data (S40), packets in encoded data to be renewed are sequentially extracted (S41). When all the packets in the encoded data to be renewed are extracted (S42), the process goes to S48. When partial encoded data are included in the encoded data to be renewed, layer levels of each packet included in the partial encoded data are extracted, and the greatest layer level in the layers of the extracted encoded data is calculated (S44). Then, a structure table having combination patterns of all layers which have the greatest level in each layer is formed (S45). Next, packets in the partial encoded data to be renewed are sequentially extracted (S43), when all the packets in the partial encoded data to be renewed are extracted (S47), the packets are stored (S48). The layer levels of the packets are investigated and an address of each packet is written in the pointer to encoded data in the structure table (S49), then the processes end.

In the renewing processes of the cache data, the data structure shown in FIG. 12 or 13 is formed, and the packets are sequentially stored in the cache 103. That is, one of the features of one embodiment of the present invention is to estimate the structure table before storing the packets in the cache 103.

By the above processes, the packets, having encoded data and stored based on the layer structure (data structure) estimated from the estimation function, can be managed.

Next, a data structure in which an access unit to cache data is a layer unit of layer encoded data is described.

Figure 15:
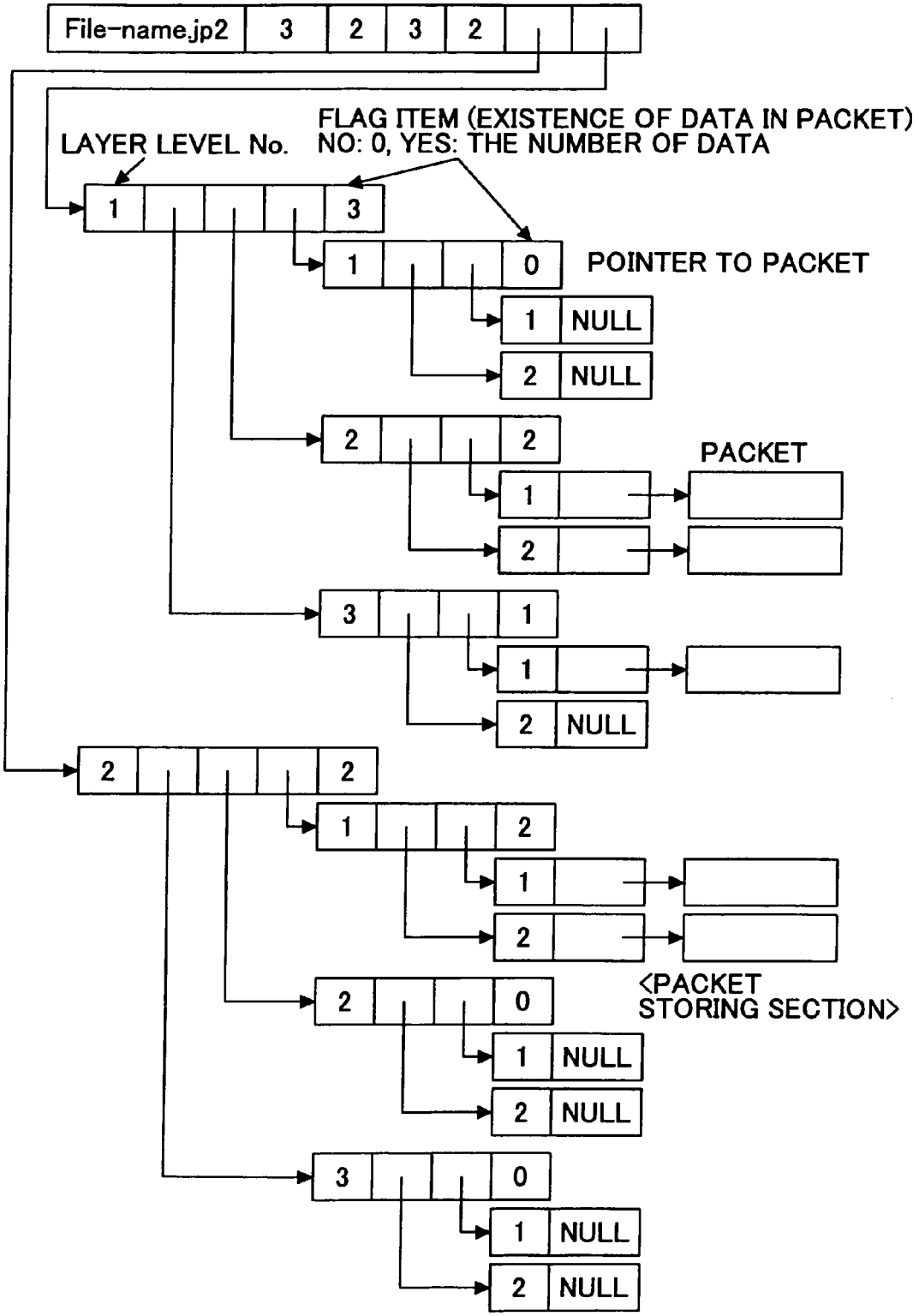
FIG. 15 is a diagram showing a data structure having a tree structure in a structure table for managing cache data according to one embodiment of the present invention.

FIG. 15 is a diagram showing a data structure having a tree structure in a structure table for managing cache data according to one embodiment of the present invention. That is, in FIG. 15, the structure table has a tree structure. The structure table shown in FIG. 15 is compatible with the structure tables shown in FIGS. 12 and 13. That is, the table structure can be converted into a tree structure and the tree structure can be converted into a table structure.

The structure table having the tree structure is composed of layer nodes. Each layer node is composed of a layer level No., all pointers to lower layer levels, and an information item. In the lowest layer, each layer node provides a layer level No. and a pointer storing region to a packet, and does not have all pointers to the lower layer levels. In addition, when a packet does not exist, the pointer storing region becomes NULL.

In the present embodiment, the cache data management table has a pointer to a layer node of the next uppermost layer. A specific layer node having the pointer to the layer node of the next uppermost layer can be provided. However, in the present embodiment, since the specific layer node is not provided, referring to a packet can be realized at high speed.

Figure 16:
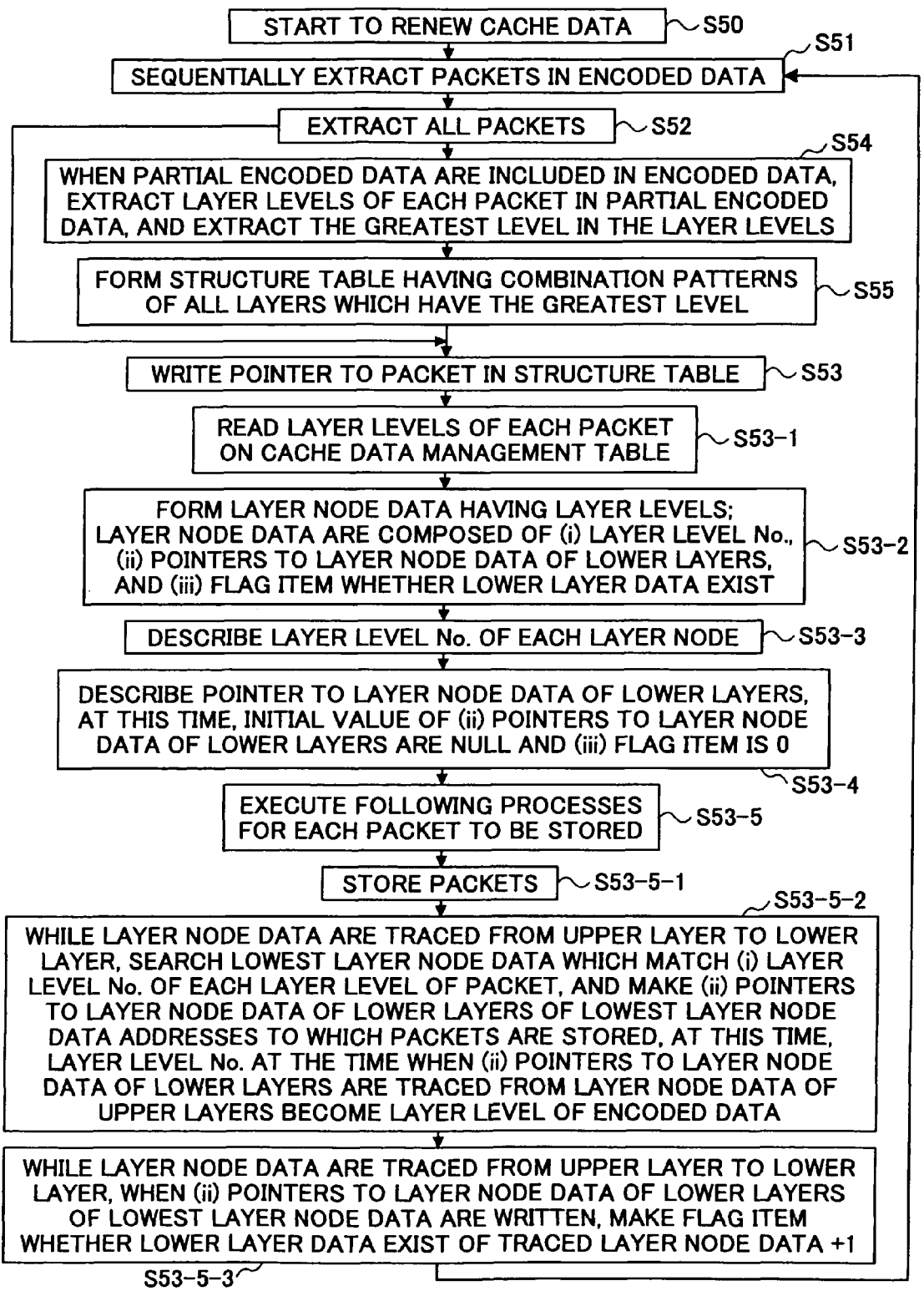
FIG. 16 is another flowchart showing processes for structuring cache data according to one embodiment of the present invention.

FIG. 16 is another flowchart showing processes for structuring cache data according to one embodiment of the present invention.

In FIG. 16, first, when the client 101 starts a cache data renewing process (S50), packets in encoded data to be renewed are sequentially extracted (S51). When all the packets in the encoded data to be renewed are extracted (S52), the process goes to S53. When partial encoded data are included in the encoded data to be renewed, the layer levels of packets including in the partial encoded data are extracted, and the greatest layer level in each layer of the extracted encoded data is calculated (S54). Then, a structure table having combination patterns of all layer levels which have the greatest layer level in each layer is formed (S55).

Next, pointers to packets are written in the structure table (S53), the layer levels of each layer on the cache data management table are read (S53-1), and layer node data having the layer levels are formed (S53-2). In this, the layer node data are composed of (i) the layer level No., (ii) pointers to the layer node data of the lower layers, and (iii) a flag item (information item) whether lower layer data exist.

Next, (i) the layer level No. of each layer node is described (S53-3), and (ii) the pointers to the layer node data of the lower layers are described (S53-4). At this time, the initial values of (ii) the pointers to the layer node data of the lower layers are NULL and (iii) the flag item whether lower layer data exist is "0".

Next, the following processes are sequentially executed for each packet to be stored (S53-5). That is, the packets are stored (S53-5-1), and while the layer node data are traced from the upper layer to the lower layer, lowest layer node data which match (i) the layer level No. of each layer level of the packet is searched, and (ii) the pointers to the layer node data of the lower layers of the lowest layer node data are made addresses to which the packets are stored (S53-5-2). At this time, the layer level No. at the time when (ii) the pointers to the layer node data of the lower layers are traced from the layer node data of the upper layers become a layer level of the encoded data.

Next, while the layer node data are traced from the upper layer to the lower layer, when (ii) the pointers to the layer node data of the lower layers of the lowest layer node data are written, (iii) the flag item whether lower layer data exist of the traced layer node data is made +1 (S53-5-3).

Next, in the cache data renewing process shown in FIG. 16, an example to form the structure table having the tree structure shown in FIG. 15 is described. Each layer node provides the information item (flag item), in FIG. 15, the information item shows existence of a packet in lower layers. When a packet is stored, a value in the information item of a layer node, which is a layer level to which the packet belongs, is counted up, and the number of data items in the lower layer is formed. That is, an identifier (information item) that determines whether encoded data exist in a layer lower than each layer is used. Therefore, by only investigating the upper layer by tracing the structural data, existence of encoded data in a layer lower than the upper layer can be obtained. Therefore, the encoded data can be referred to at high speed by using the layer structure data and the layer structure data can be efficiently referred to.

By using the data structure shown in FIG. 15, 12, or 13, a packet that belongs to a layer level can be easily referred to. That is, in the data structure, a packet which belongs to a layer level can be easily known, and the packet is stored in a format systemized by the layer level in each layer. For example, encoded data whose layer level of the uppermost layer is 1 can be searched for in a packet whose layer level of the uppermost layer corresponding to the encoded data is 1. In the data structure having the table structure shown in FIG. 12 or 13, since packets are sequentially arrayed, a packet can be referred to at high speed. In the data structure having the tree structure shown in FIG. 15, a packet can be easily referred to by tracing pointers from a layer node whose layer level number is 1 to a lower layer node.

By adjusting the above data structures, a control unit of packets of encoded data to be stored can be an access unit. Therefore, accessing efficiency to partial encoded data can be high.

In addition, when a packet which is not stored in the cache 103 exists in encoded data requested by the client 101, the client 101 requests the server 102 to resend the lacking packet.

Next, processes to resend a lacking packet are described.

Figure 17:
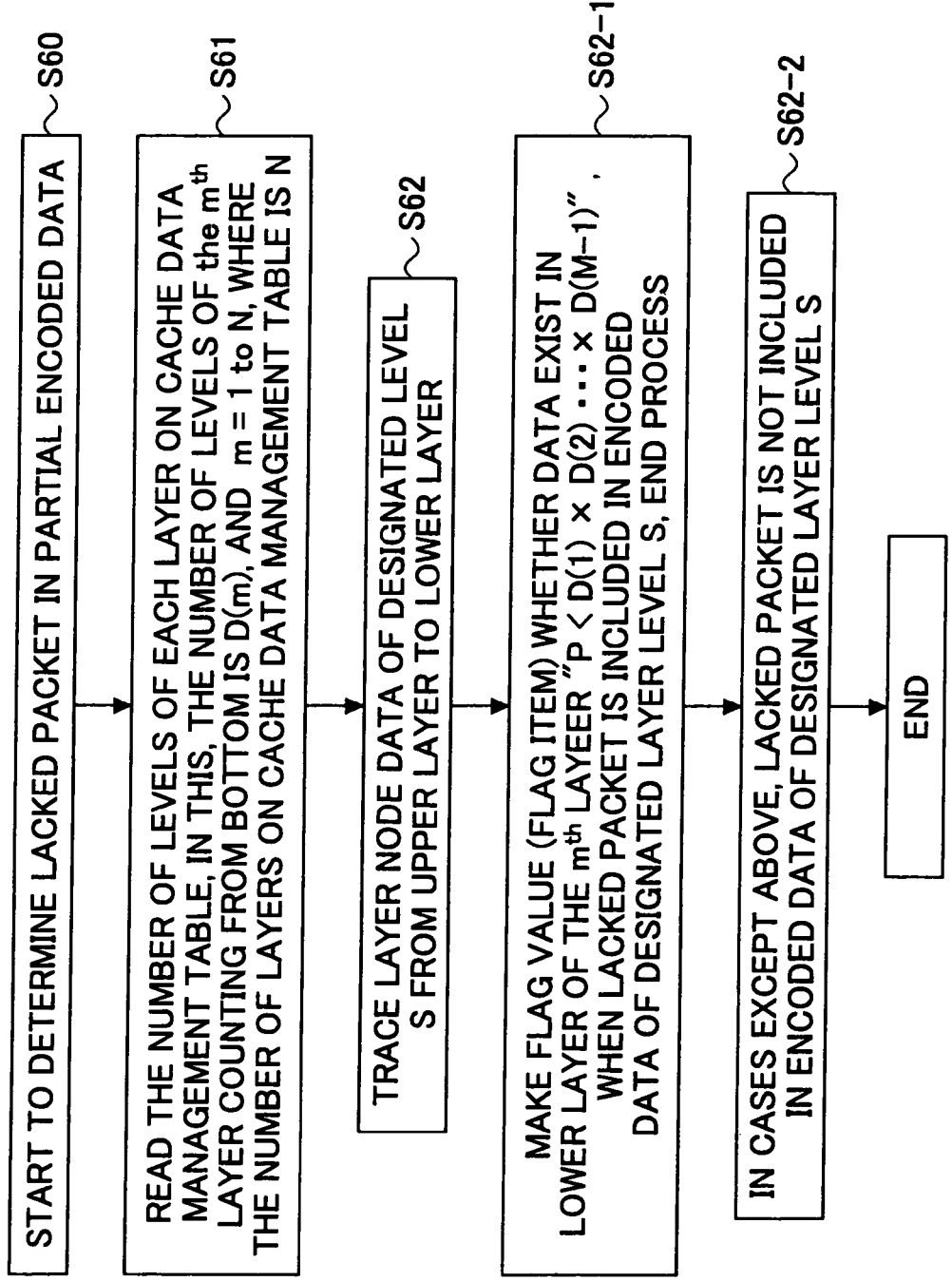
FIG. 17 is a flowchart showing processes for determining a lacking packet by analyzing the structure table having the tree structure shown in FIG. 15 according to one embodiment of the present invention.

FIG. 17 is a flowchart showing processes for determining a lacking packet by analyzing the structure table having the tree structure shown in FIG. 15 according to one embodiment of the present invention. The lacking packet in the partial encoded data can be calculated by using the processes shown in FIG. 17.

First, as shown in FIG. 17, the client 101 starts to determine a lacking packet in partial encoded data (S60). The number of levels of each layer on the cache data management table is read (S61). In this, the number of levels of the $m^{th}$ layer counting from the bottom is D(m), and m=1 to N, where the number of layers on the cache data management table is N.

Next, layer node data of a designated layer level S are traced from the upper layer to the lower layer (S62). The flag value (flag item) P (iii) whether data exist in a lower layer of the $m^{th}$ layer is made "P<D(1)×D(2) . . . ×D(M−1)" (S62-1). When a lacking packet is included in encoded data of the designated layer level S, the process ends. In cases except the above, a lacking packet is not included in encoded data of the designated layer level S (S62-2).

In a client/server model, for example, the client receives partial encoded data of layer encoded data from the server, and the client calculates a lacking packet of the received partial encoded data by using the above processes and receives partial encoded data including the lacking packet.

Figure 18:
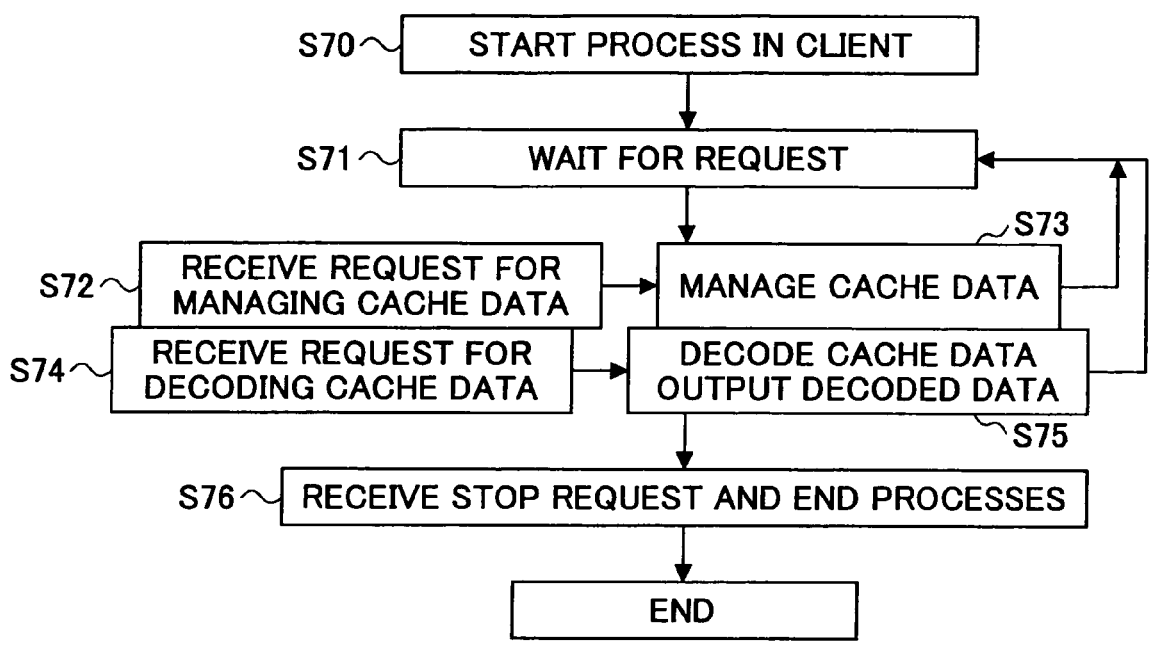
FIG. 18 is another flowchart showing processes for managing cache data according to one embodiment of the present invention.

FIG. 18 is a flowchart showing processes for managing cache data according to one embodiment of the present invention.

As shown in FIG. 18, first, when the client 101 is started (S70), the client 101 waits for a request (S71). When the client 101 receives a request for managing cache data (S72), the client 101 manages the cache data (S73). When the client 101 receives a request for decoding cache data (S74), the client 101 decodes the cache data and outputs the decoded data (S75). When the client 101 receives a stop request (S76), the client 101 ends the processes.

As described above, in one embodiment in which a packet is referred to by using the data structure, a packet of a level of a specific layer can be easily designated, and determination whether all encoded data of a specific layer exist can be easily executed by using the lacking packet determining process. Therefore, when all encoded data of a specific layer do not exist in the cache 103, the client 101 can also download all the encoded data from the server 102. Therefore, packets which are frequently used can be easily obtained.

The client 101 can download a lacking packet from the server 102 by background processing. That is, the downloading the lacking packet is not limited to the time when a user requests the down loading.

Figure 19:
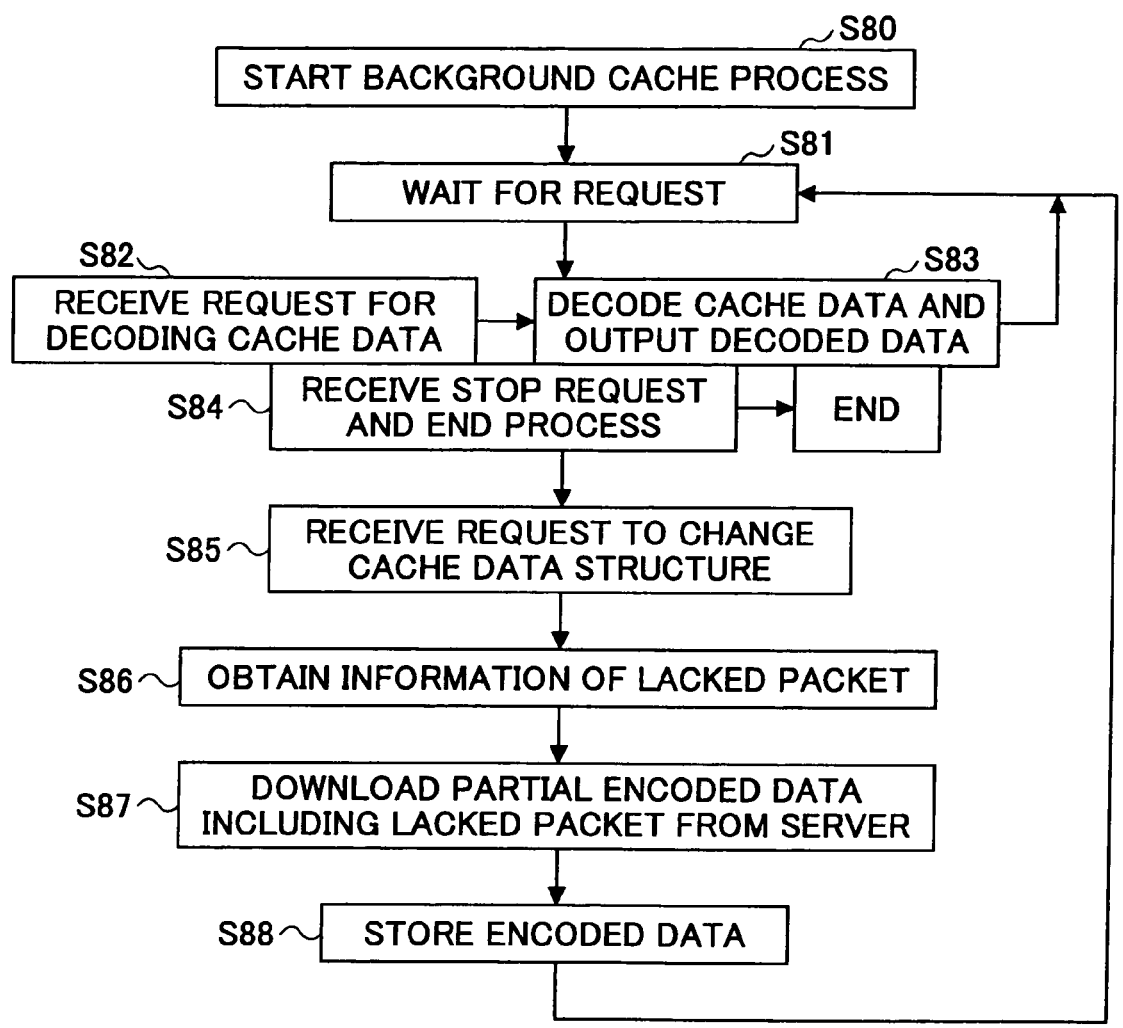
FIG. 19 is a flowchart showing processes of a background cache process according to one embodiment of the present invention.

FIG. 19 is a flowchart showing processes of a background cache process according to one embodiment of the present invention.

As shown in FIG. 19, first, when the client 101 starts a background cache process (S80), the client 101 waits for a request (S81). When the client 101 receives a request for decoding cache data (S82), the client 101 decodes the cache data and outputs the decoded data (S83). When the client 101 receives a stop request (S84), the client 101 ends the operations.

Next, when the client 101 requests to change a cache data structure (S85), information of a lacking packet is obtained (S86), the client 101 downloads partial encoded data including the lacking packet from the server 102 (S87), and the encoded data are stored in the cache 103 (S88).

Next, a changing control of a data structure of cache data is described.

Importance of each layer is estimated by utilizing the frequency of use of a progression of layer encoded data. When a user uses layer encoded data, the user generally uses encoded data having a progression in which an important layer is an upper level. In one embodiment of the present invention, the data structure of the cache data is formed so that the data structure of the cache data has the most frequent progression based on the importance of each layer. Therefore, downloading partial encoded that are referred to frequently can be easily executed, and the cache 103 can be efficiently managed.

Figure 20:
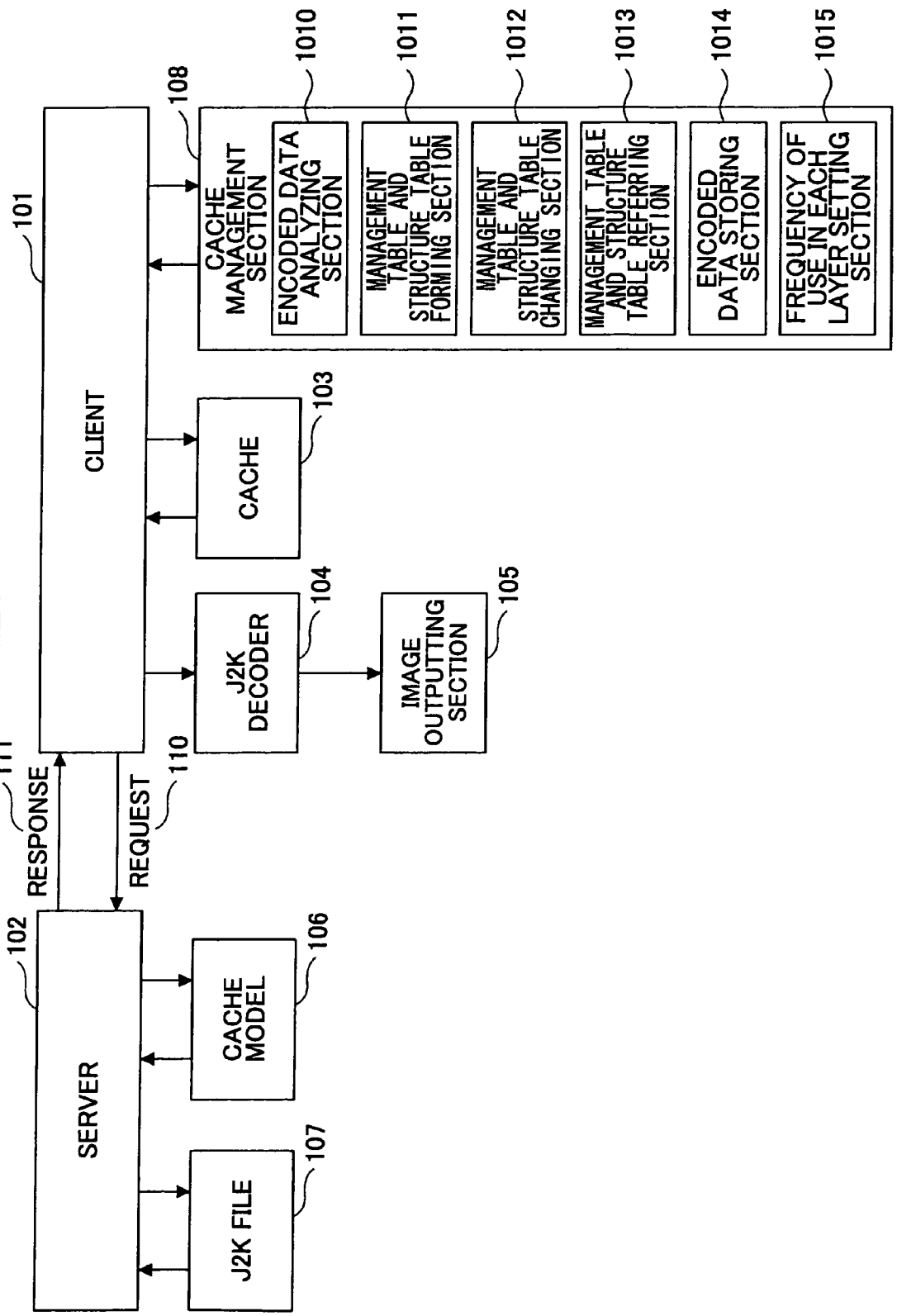
FIG. 20 is a block diagram showing a client/server model in a case where cache data are managed by importance of layer levels based on the frequency of use according to one embodiment of the present invention.

FIG. 20 is a block diagram showing a client/server model in a case where cache data are managed by importance of layer levels based on the frequency of use. When the block diagram shown in FIG. 20 is compared with that shown in FIG. 3, the block diagram shown in FIG. 20 includes a frequency of use in each layer setting section 1015 in the cache management unit 108. In the frequency of use in each layer setting section 1015, the importance of encoded data in each layer is set based on the progression of the encoded data which are frequently used.

Figure 21:
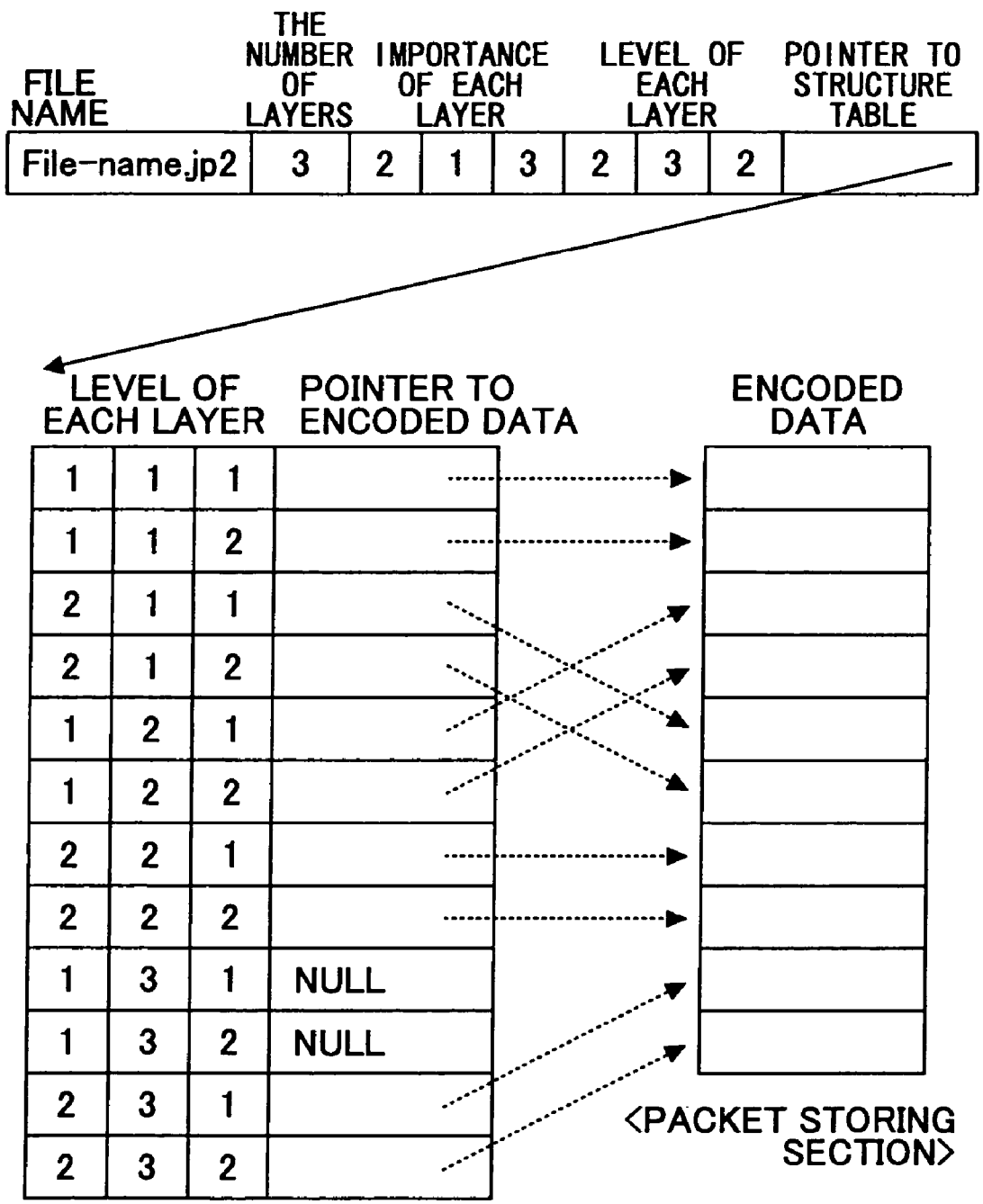
FIG. 21 is a diagram showing a data structure for managing cache data in which the importance of encoded data in each layer is stored according to one embodiment of the present invention.

FIG. 21 is a diagram showing a data structure for managing cache data in which the importance of encoded data in each layer is stored according to one embodiment of the present invention. As shown in FIG. 21, in a management table, the importance of each layer of encoded data is stored. The importance of the encoded data in each layer is stored based on the frequency of use of the encoded data.

In the flowchart shown in FIG. 11, a change is added to the structure table by the frequency of use of the encoded data in each layer, if necessary; and the reference range of packets on the cache 103 is adjusted. That is, the encoded data are downloaded based on the importance of the encoded data in each layer when the encoded data are used.

Figure 22:
FIG. 22 is a diagram illustrating a method that changes the order of progression of encoded data on the cache according to one embodiment of the present invention.

FIG. 22 is a diagram illustrating a method which changes the order of progression of encoded data on the cache 103 according to one embodiment of the present invention. In FIG. 22, a table structure similar to that shown in FIG. 12 is shown; however, a tree structure similar to that shown in FIG. 15 can be used. That is, one structure can be converted into the other structure. When the structure table is changed, the order of rows in which the layer levels are written is changed in a row unit. That is, the data in the row unit are arranged in the order of the layer levels from the uppermost layer level to the lowest layer level in each layer. The processes are continued without suffering any damage to the arranged row.

As another embodiment of the present invention, layer encoded data stored by being applied a layer structure or layer encoded data stored by not being applied the layer structure can be managed. In this case, the layer encoded data are managed by the frequency of use.

In FIG. 20, the frequency of use in each layer setting section 1015 calculates the frequency of use of the order of progressions of layer encoded data. The frequency of use of the layer encoded data stored by being applied in the layer structure or by not being applied in the layer structure is collected. When the frequency of use of the layer encoded data stored by being applied in the layer structure is large, the data structure of the present embodiment is used. With this, the process performance can be high.

As described above, cases in which encoded data not stored in the cache 103 are downloaded from the server 102 to the client 101 are described. However, the order of the packets can be easily changed by using the data structure according to one embodiment of the present invention. Therefore, the order of the packets can be adjusted so that the order becomes the progression order allowed by a decoder.

Further, the present invention is not limited to the specifically disclosed embodiment, and variations and modifications may be made without departing from the scope of the present invention.

What is claimed is:

1. An image processing apparatus which loads partial encoded data via a network, comprising:
 a hardware circuit in the image processing apparatus, the hardware circuit including an extraction unit, an estimation unit, a writing unit, and a formation unit, wherein:
 the extraction unit extracts layer levels of each packet included in the partial encoded data;
 the estimation unit calculates a number of layer levels of each packet based on the layer levels of each packet extracted by the extraction unit and estimates a greatest layer level of each packet;
 the writing unit writes the greatest layer level of each packet estimated by the estimation unit in a management table; and
 the formation unit forms a layer data table in which each layer has the greatest layer level estimated by the estimation unit;
 wherein the writing unit compares each layer level written in the management table with the layer levels of each packet included in newly received partial encoded data, and changes the layer levels of each layer written in the management table to the layer levels of each layer included in the newly received partial encoded data when the layer levels included in the newly received partial encoded data are larger than the layer levels written in the management table.

2. The image processing apparatus as claimed in claim 1, wherein:
 the partial encoded data are formed by JPEG 2000 code streams or JPIP streams.

3. The image processing apparatus as claimed in claim 2, wherein:
 the extraction unit extracts the layer levels by referring to code streams of JPEG 2000 or streams of JPIP when the partial encoded data are formed by the JPEG 2000 code streams or the JPIP streams.

4. An image processing method in which partial encoded data are loaded via a network, comprising:
 extracting layer levels of each packet included in the partial encoded data;
 calculating a number of layer levels of each packet based on the extracted layer levels of each packet and estimating a greatest layer level of each packet;
 writing the greatest layer level of each packet in a management table;
 forming a layer data table in which each layer has the greatest layer level;
 using a computer processor to execute a program to compare each layer level written in the management table with layer levels of each packet included in newly received partial encoded data and to change the layer levels of each layer written in the management table to the layer levels of each layer included in the newly received partial encoded data when the layer levels included in the newly received partial encoded data are larger than the layer levels written in the management table.

5. The image processing method as claimed in claim 4, wherein:
 the partial encoded data are formed by JPEG 2000 code streams or JPIP streams.

6. The image processing method as claimed in claim 5, wherein:
 the layer levels are extracted by referring to code streams of JPEG 2000 or streams of JPIP when the partial encoded data are formed by the JPEG 2000 code streams or the JPIP streams.

* * * * *